United States Patent
Yang et al.

(10) Patent No.: US 9,889,733 B2
(45) Date of Patent: Feb. 13, 2018

(54) POWER TRANSMISSION SYSTEM AND VEHICLE COMPRISING THE SAME

(71) Applicant: BYD COMPANY LIMITED, Shenzhen, Guangdong (CN)

(72) Inventors: Dongsheng Yang, Guangdong (CN); Yubo Lian, Guangdong (CN); Jintao Zhang, Guangdong (CN); Hongbin Luo, Guangdong (CN)

(73) Assignee: BYD COMPANY LIMITED, Shenzhen (CN)

( * ) Notice: Subject to any disclaimer, the term of this patent is extended or adjusted under 35 U.S.C. 154(b) by 189 days.

(21) Appl. No.: 14/755,629

(22) Filed: Jun. 30, 2015

(65) Prior Publication Data

US 2016/0207390 A1    Jul. 21, 2016

(30) Foreign Application Priority Data

Jan. 16, 2015 (CN) .......................... 2015 1 0024314
Jan. 16, 2015 (CN) ..................... 2015 2 0033349 U

(51) Int. Cl.
     *F16H 3/08*      (2006.01)
     *B60K 6/36*      (2007.10)
     (Continued)

(52) U.S. Cl.
     CPC .................. *B60K 6/36* (2013.01); *B60K 6/38* (2013.01); *B60K 6/448* (2013.01); *B60K 6/48* (2013.01);
     (Continued)

(58) Field of Classification Search
     CPC ....................... F16H 37/021; F16H 2003/0931
     (Continued)

(56) References Cited

U.S. PATENT DOCUMENTS

| | | |
|---|---|---|
| 4,132,133 A | 1/1979 | Ballendux |
| 4,610,177 A | 9/1986 | Mahoney |
| | (Continued) | |

FOREIGN PATENT DOCUMENTS

| | | |
|---|---|---|
| CN | 102166962 | 8/2011 |
| CN | 102343824 | 2/2012 |
| | (Continued) | |

OTHER PUBLICATIONS

Extended European Search Report dated Jun. 29, 2016, issued in related European Patent Application No. 15158699.7 (8 pages).
(Continued)

*Primary Examiner* — Ha D Ho

(57) ABSTRACT

A power transmission system for a vehicle includes: an engine; input shafts, at least one of which configured to selectively engage with the engine, each of the input shafts being provided with a shift driving gear thereon; output shafts, each of the output shafts being provided with a shift driven gear configured to mesh with a corresponding shift driving gear; a motor power shaft configured to rotate together with one of the output shafts; and a first motor generator configured to rotate together with the motor power shaft, wherein when the motor power shaft is rotated together with one of the output shafts, the first motor generator is configured to generate electric power utilizing at least parts of power generated by the engine while the vehicle in a running state or a parking state. A vehicle including the power transmission system is also provided.

21 Claims, 6 Drawing Sheets

(51) Int. Cl.
*B60K 6/38* (2007.10)
*F16H 3/085* (2006.01)
*B60K 6/448* (2007.10)
*B60K 6/48* (2007.10)
*B60K 6/52* (2007.10)
*B60K 6/547* (2007.10)
*F16H 3/00* (2006.01)
*F16H 3/093* (2006.01)
*B60K 1/02* (2006.01)
*B60K 17/356* (2006.01)

(52) U.S. Cl.
CPC ............ *B60K 6/52* (2013.01); *B60K 6/547* (2013.01); *F16H 3/085* (2013.01); *B60K 1/02* (2013.01); *B60K 17/356* (2013.01); *B60K 2006/4808* (2013.01); *B60Y 2304/00* (2013.01); *B60Y 2400/428* (2013.01); *B60Y 2400/70* (2013.01); *F16H 3/006* (2013.01); *F16H 2003/0931* (2013.01); *Y02T 10/626* (2013.01); *Y02T 10/6221* (2013.01); *Y02T 10/6243* (2013.01); *Y02T 10/6265* (2013.01); *Y10S 903/909* (2013.01); *Y10S 903/912* (2013.01); *Y10S 903/919* (2013.01)

(58) Field of Classification Search
USPC .................................. 74/330, 331, 333, 340
See application file for complete search history.

(56) References Cited

U.S. PATENT DOCUMENTS

| | | | |
|---|---|---|---|
| 4,676,115 A | 6/1987 | Morscheck et al. | |
| 5,081,365 A | 1/1992 | Field et al. | |
| 5,586,613 A | 12/1996 | Ehsani | |
| 5,890,392 A | 4/1999 | Ludanek et al. | |
| 6,120,115 A | 9/2000 | Kouta et al. | |
| 6,364,434 B1 | 2/2002 | Min et al. | |
| 6,634,247 B2 | 10/2003 | Pels | |
| 7,296,648 B2 | 11/2007 | Tatara et al. | |
| 7,383,749 B2 | 6/2008 | Schafer et al. | |
| 7,395,889 B2 | 7/2008 | Sugiyama et al. | |
| 7,428,852 B2 | 9/2008 | Baldwin et al. | |
| 7,437,966 B2 | 10/2008 | Maillard et al. | |
| 7,730,982 B2 | 6/2010 | Hidaka et al. | |
| 7,987,739 B2 | 8/2011 | Okadome et al. | |
| 8,297,141 B2* | 10/2012 | Cimatti | B60K 6/48 74/330 |
| 8,505,400 B2 | 8/2013 | Mellet et al. | |
| 8,522,635 B2* | 9/2013 | Pastorello | B60K 6/48 74/330 |
| 8,523,734 B2 | 9/2013 | Mepham et al. | |
| 8,579,059 B2 | 11/2013 | Teraya | |
| 8,608,615 B2* | 12/2013 | Fuechtner | B60K 6/48 477/3 |
| 8,887,588 B2 | 11/2014 | Koyama et al. | |
| 8,931,371 B2 | 1/2015 | Xie et al. | |
| 9,145,951 B2 | 3/2015 | Ho et al. | |
| 9,003,907 B2 | 4/2015 | Weller et al. | |
| 9,341,239 B2 | 5/2016 | Lee et al. | |
| 9,568,066 B2 | 2/2017 | Yang et al. | |
| 2002/0088291 A1 | 7/2002 | Bowen | |
| 2002/0177504 A1 | 11/2002 | Pels et al. | |
| 2003/0184147 A1 | 10/2003 | Perach | |
| 2004/0204286 A1 | 10/2004 | Stridsberg | |
| 2005/0139035 A1 | 6/2005 | Lee et al. | |
| 2006/0048516 A1 | 3/2006 | Tenbrock et al. | |
| 2006/0175103 A1 | 8/2006 | Iida et al. | |
| 2007/0028718 A1 | 2/2007 | Lee et al. | |
| 2007/0102211 A1 | 5/2007 | Nozaki et al. | |
| 2007/0175723 A1 | 8/2007 | Blessing et al. | |
| 2007/0266810 A1 | 11/2007 | Forsyth | |
| 2007/0272457 A1 | 11/2007 | Kodama et al. | |
| 2008/0099305 A1 | 5/2008 | Ogasawara | |
| 2008/0134819 A1 | 6/2008 | Kapp et al. | |
| 2008/0202267 A1 | 8/2008 | Hendrickson et al. | |
| 2009/0145673 A1 | 6/2009 | Soliman et al. | |
| 2010/0031910 A1 | 2/2010 | Seufert et al. | |
| 2010/0076657 A1 | 3/2010 | Jinno et al. | |
| 2010/0120580 A1 | 5/2010 | Mepham et al. | |
| 2011/0098151 A1 | 4/2011 | Ziemer | |
| 2011/0113923 A1 | 5/2011 | Pesola et al. | |
| 2011/0245033 A1 | 10/2011 | Sato et al. | |
| 2011/0265601 A1 | 11/2011 | Pastorello et al. | |
| 2012/0010041 A1 | 1/2012 | Soliman et al. | |
| 2012/0053011 A1 | 3/2012 | Onomura et al. | |
| 2012/0160044 A1 | 6/2012 | Kahl | |
| 2012/0245781 A1 | 9/2012 | Kanamori et al. | |
| 2012/0245783 A1 | 9/2012 | Tamagawa | |
| 2012/0303201 A1 | 11/2012 | Tsuneishi et al. | |
| 2012/0310461 A1 | 12/2012 | Maruyama et al. | |
| 2012/0325048 A1 | 12/2012 | Raisch | |
| 2012/0325573 A1 | 12/2012 | Miller | |
| 2013/0090202 A1 | 4/2013 | Hiraiwa | |
| 2013/0096749 A1 | 4/2013 | Hussain et al. | |
| 2013/0096784 A1 | 4/2013 | Kohler et al. | |
| 2013/0166118 A1 | 6/2013 | Kim | |
| 2013/0192417 A1 | 8/2013 | Fujita et al. | |
| 2013/0288854 A1 | 10/2013 | Kobayashi | |
| 2013/0345019 A1 | 12/2013 | Kaltenbach et al. | |
| 2014/0128205 A1 | 5/2014 | Phillips et al. | |
| 2015/0167786 A1 | 6/2015 | Kim | |
| 2015/0167803 A1 | 6/2015 | Lee et al. | |
| 2015/0291154 A1 | 10/2015 | Kaltenbach et al. | |
| 2016/0084351 A1 | 3/2016 | Lee et al. | |
| 2016/0298733 A1 | 10/2016 | Bender et al. | |

FOREIGN PATENT DOCUMENTS

| | | |
|---|---|---|
| CN | 102381178 | 3/2012 |
| CN | 102717714 | 10/2012 |
| CN | 202641405 | 1/2013 |
| DE | 10239540 A1 | 3/2004 |
| DE | 102008002381 A1 | 12/2009 |
| DE | 102011086743 A1 | 5/2013 |
| DE | 102011089467 A1 | 6/2013 |
| DE | 102012222122 A1 | 6/2014 |
| EP | 1122109 A2 | 8/2001 |
| EP | 1375241 | 2/2004 |
| EP | 1555184 | 7/2005 |
| EP | 1979185 | 10/2008 |
| EP | 1990229 A2 | 12/2008 |
| EP | 2080682 | 7/2009 |
| EP | 2133252 | 12/2009 |
| EP | 2210758 A1 | 7/2010 |
| EP | 2385270 A1 | 11/2011 |
| EP | 2390127 A1 | 11/2011 |
| EP | 2439094 A1 | 4/2012 |
| EP | 2460704 | 6/2012 |
| EP | 2508378 A1 | 10/2012 |
| EP | 2517938 A1 | 10/2012 |
| EP | 2631103 | 8/2013 |
| EP | 2636554 | 9/2013 |
| EP | 2636566 | 9/2013 |
| EP | 2636567 | 9/2013 |
| EP | 2995477 | 3/2016 |
| EP | 2995487 | 3/2016 |
| JP | H0993714 A | 4/1997 |
| JP | 2001157305 | 6/2001 |
| JP | 2001191814 | 7/2001 |
| JP | 2005133682 | 5/2005 |
| JP | 2010070188 A | 4/2010 |
| JP | 2010076761 A | 4/2010 |
| JP | 2010179789 | 8/2010 |
| JP | 2010281237 | 12/2010 |
| JP | 2012086701 | 5/2012 |
| JP | 2013199909 | 10/2013 |
| KR | 101339264 | 12/2013 |
| WO | WO 99/21263 A2 | 4/1999 |
| WO | WO 2008/092353 A1 | 8/2008 |
| WO | WO 2010/054210 A1 | 5/2010 |
| WO | 2011138308 A1 | 11/2011 |
| WO | 2012152613 | 11/2012 |

(56) References Cited

FOREIGN PATENT DOCUMENTS

| WO | WO 2013/014510 A1 | 1/2013 |
|----|---|---|
| WO | WO 2013/031491 A1 | 3/2013 |
| WO | 2015032346 | 3/2015 |

OTHER PUBLICATIONS

Final Office Action dated Jun. 17, 2016, issued in related U.S. Appl. No. 14/527,600 (19 pages).
Final Office Action dated Jun. 28, 2016, issued in related U.S. Appl. No. 14/527,410 (21 pages).
Notice of Allowance dated Oct. 19, 2016, issued in related U.S. Appl. No. 14/527,446 (7 pages).
Final Office Action dated Oct. 20, 2016, issued in related U.S. Appl. No. 14/527,496 (8 pages).
Notice of Allowance dated Oct. 26, 2016, issued in related U.S. Appl. No. 14/527,600 (19 pages).
Notice of Allowance dated Nov. 1, 2016, issued in related U.S. Appl. No. 14/644,943 (8 pages).
Notice of Allowance dated Nov. 4, 2016, issued in related U.S. Appl. No. 14/527,496 (8 pages).
Notice of Allowance dated Nov. 4, 2016, issued in related U.S. Appl. No. 14/644,818 (7 pages).
European Search Report dated Dec. 10, 2015, issued in related European Patent Application No. 15158696.3 (8 pages).
European Search Report dated Dec. 10, 2015, issued in related European Patent Application No. 15158701.1 (8 pages).
European Search Report dated Feb. 2, 2016, issued in related European Patent Application No. 15158686.4 (9 pages).
Non-Final Office Action dated Jun. 2, 2016, issued in related U.S. Appl. No. 14/526,816 (8 pages).
Non-Final Office Action dated Mar. 7, 2016, issued in related U.S. Appl. No. 14/527,600 (11 pages).
Non-Final Office Action dated Mar. 8, 2016, issued in related U.S. Appl. No. 14/527,410 (21 pages).
Non-Final Office Action dated May 31, 2016, issued in related U.S. Appl. No. 14/527,446 (9 pages).
Non-Final Office Action dated May 5, 2016, issued in related U.S. Appl. No. 14/527,496 (8 pages).
Non-Final Office Action dated Sep. 24, 2015, issued in related U.S. Appl. No. 14/527,522 (17 pages).
European Search Report and Written Opinion for Application No. 14880411.5, dated Apr. 11, 2017, 12 pages.
European Search Report and Written Opinion for Application No. 14881104.5, dated May 5, 2017, 8 pages.
Non-Final Office Action for U.S. Appl. No. 14/527,410, dated Jan. 13, 2017, 23 pages.
Non-Final Office Action for U.S. Appl. No. 14/755,540, dated Jan. 26, 2017, 15 pages.
Non-Final Office Action for U.S. Appl. No. 14/755,695, dated May 4, 2017, 6 pages.
Non-Final Office Action for U.S. Appl. No. 14/755,775, dated May 10, 2017, 9 pages.
Non-Final Office Action for U.S. Appl. No. 14/644,881, dated May 19, 2017, 29 pages.
Final Office Action for U.S. Appl. No. 14/755,540, dated May 24, 2017, 11 pages.
Final Office Action for U.S. Appl. No. 14/527,410, dated Jun. 6, 2017, 26 pages.
Non-Final Office Action for U.S. Appl. No. 14/527,522, dated Aug. 7, 2017, 11 pages.
Non-Final Office Action for U.S. Appl. No. 14/527,572, dated Aug. 23, 2017, 31 pages.
Final Office Action for U.S. Appl. No. 14/755,540, dated Sep. 19, 2017, 10 pages.

\* cited by examiner ered and benefits of Chinese
POWER TRANSMISSION SYSTEM AND VEHICLE COMPRISING THE SAME

CROSS-REFERENCE TO RELATED APPLICATIONS

This application claims priority to and benefits of Chinese Patent Application Nos. 201510024314.X and 201520033349.5, both filed with the State Intellectual Property Office of P. R. China on Jan. 16, 2015. The entire contents of the above-identified applications are incorporated herein by reference.

FIELD

Embodiments of the present disclosure relate to vehicles, and more particularly to a power transmission system for a vehicle, and a vehicle including the power transmission system.

BACKGROUND

To reduce energy consumption, the development and utilization of energy-efficient vehicles have become a trend. As an energy-efficient vehicle, a hybrid vehicle is driven by at least one of an internal combustion engine and a motor and has various operation modes, and consequently may operate with improved transmission efficiency and fuel efficiency.

However, in the related art, the power transmission system in the hybrid vehicle is generally complex in structure, provides fewer transmission modes, and is low in transmission efficiency. Besides, for most hybrid vehicles, the charging process is always carried out during the running of the vehicle. Therefore, a conventional hybrid vehicle has relatively fewer charging modes and charging passage, and lower charging efficiency.

SUMMARY

Embodiments of the present disclosure seek to solve at least one of the problems existing in the prior art to at least some extent.

Embodiments of a broad aspect of the present disclosure provide a power transmission system for a vehicle. The power transmission system for a vehicle according to embodiments of the present disclosure includes: an engine; a plurality of input shafts, at least one of the input shafts being configured to selectively engage with the engine, each of the input shafts being provided with a shift driving gear thereon; a plurality of output shafts, each of the output shafts being provided with a shift driven gear configured to mesh with a corresponding shift driving gear; a motor power shaft configured to rotate together with one of the output shafts; and a first motor generator configured to rotate together with the motor power shaft, when the motor power shaft is rotated together with one of the output shafts, the first motor generator is configured to generate electric power utilizing at least parts of power generated by the engine while a vehicle in a running state or a parking state.

Embodiments of another broad aspect of the present disclosure provide a vehicle. The vehicle, according to embodiments of the present disclosure, includes the above-identified power transmission system for a vehicle.

With the power transmission system and the vehicle according to embodiments of the present disclosure, the transmission modes are increased, and various conditions, such as charging the vehicle while parking or charging the vehicle while driving, may be accomplished.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
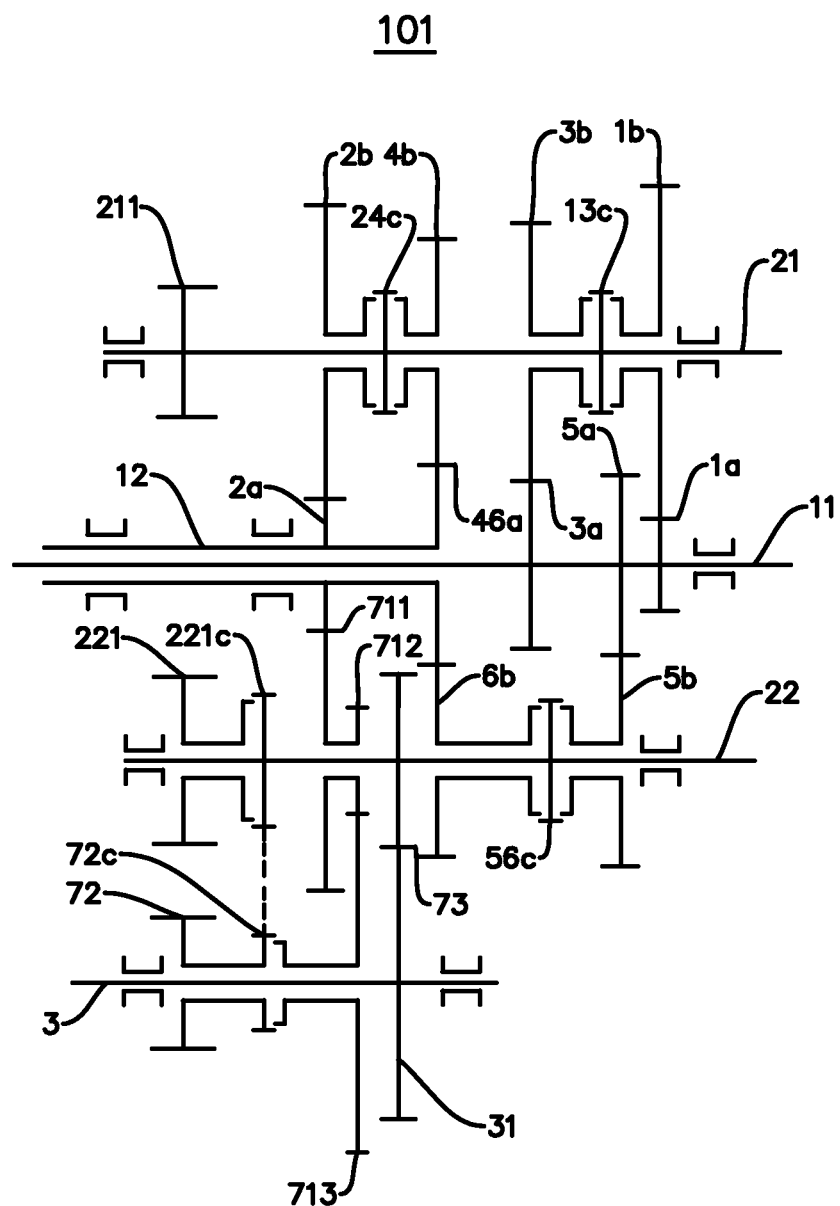
FIG. 1 is a schematic view of an exemplary power transmission system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it should be understood that the terms such as "central", "longitudinal", "lateral", "width", "thickness", "above", "below", "front", "rear", "right", "left", "vertical", "horizontal", "top", "bottom", "inner", "outer", "clockwise", "counter-clockwise" should be construed to refer to the orientation as then described or as shown in the drawings. These terms are merely for convenience and concision of description and do not alone indicate or imply that the device or element referred to must have a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more of these features. In the description of the present disclosure, "a plurality of" means two or more than two of these features, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

A power transmission system according to embodiments of the present disclosure may be described below with reference to FIGS. 1-5. The power transmission system according to embodiments of the present disclosure may be used in vehicles such as hybrid vehicles as a power system, which may provide sufficient power and electric power for driving the vehicle.

Figure 6:
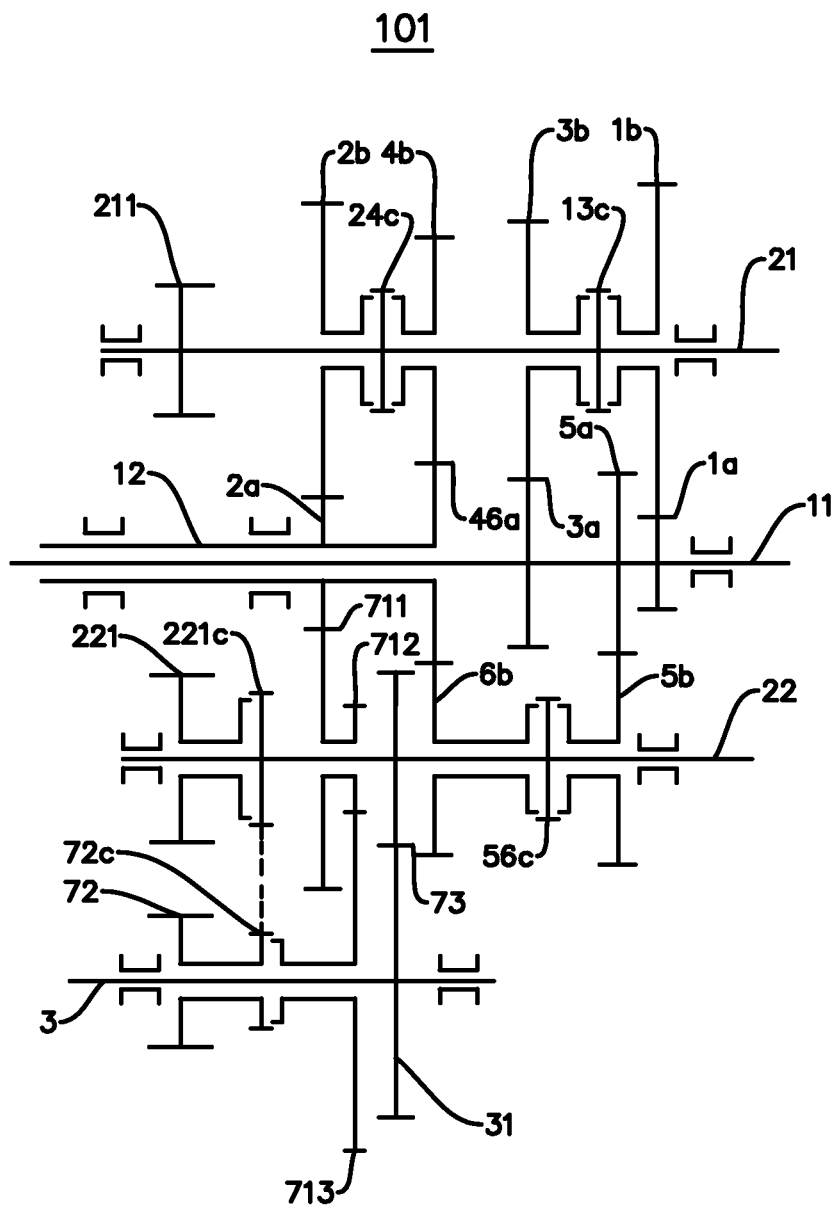
FIG. 6 is a schematic view of an exemplary power transmission unit of a power transmission system according to an embodiment of the present disclosure.

In some embodiments, a power transmission system 100 may generally include a power unit and a transmission unit. The power unit may be an engine 4, a motor generator, and so on. In some embodiments, the transmission unit 101 as shown in FIG. 6 may transmit power output from the power unit, thus driving or charging the vehicle.

In some embodiments, as shown in FIGS. 1-5, the power transmission system 100 may include, but is not limited to, an engine 4, a first motor generator 51 and a transmission unit 101.

In some embodiments as shown in, for example, FIG. 1, the transmission 101 unit includes a plurality of input shafts (e.g., a first input shaft 11, a second input shaft 12), a plurality of output shafts (e.g., a first output shaft 21, a second output shaft 22), a motor power shaft 3, a plurality of gears provided on related shafts (such as the input shaft, the output shaft, and the motor power shaft), and a gear shift member such as a synchronizer.

In some embodiments, the engine 4 is configured to selectively engage with at least one of the input shafts, when the engine 4 performs power transmission with the input shaft(s). For example, when the engine 4 is transmitting power to the input shaft, the engine 4 may selectively engage with one of the input shafts to transmit power. In some embodiments, the engine 4 may be selectively engage with two or more of the input shafts simultaneously to transmit power.

In some embodiments, as shown in FIGS. 1-5, the plurality of input shafts include a first input shaft 11 and a second input shaft 12. The engine 4 may selectively engage with one of the first and second input shafts 11, 12 to transmit power. In some embodiments, the engine 4 may engage with the first and second input shafts 11, 12 simultaneously to transmit power. It should be noted that the engine 4 may be disengaged from the first and second input shafts 11, 12 simultaneously.

It is known to a person skilled in the art that the engagement between the engine 4 and the input shaft(s) is related to specific conditions of the power transmission system 100. The engagement between the engine 4 and the input shaft(s) will be described below in detail with reference to detailed embodiments.

In some embodiments, the power transmission between the input shaft(s) and the output shaft(s) is achieved by shaft gear pairs. For example, each of the input shafts has a shaft driving gear provided thereon, each of the output shafts has a shaft driven gear provided thereon, so that a plurality of gear pairs with different velocity ratios are formed by meshes of corresponding shaft driving gears and shaft driven gears.

In some embodiments, the transmission unit may be a six-speed transmission, i.e., the transmission unit may include a first-gear gear pair, a second-gear gear pair, a third-gear gear pair, a fourth-gear gear pair, a fifth-gear gear pair and a sixth-gear gear pair. There are no particular limits in the present disclosure, a person skilled in the art may increase or reduce the number of gear pairs accordingly based on transmission requirements, and the transmission unit may not be limited to the six-speed transmission as disclosed in the present embodiment.

In some embodiments, as shown in, for example, FIGS. 1-6, the motor power shaft 3 is configured to rotate together with one of the output shafts, such as the second output shaft 22. In some embodiments, when power (such as power transmitted to an output shaft from the engine 4) needs to be transmitted to the motor power shaft 3, the motor power shaft 3 can rotate together with the output shaft while receiving the power. In some embodiments, when power (such as power transmitted to the motor power shaft 3 from a first motor generator 51) needs to be transmitted to an output shaft, this output shaft can rotate together with the motor power shaft 3 while receiving power.

In some specification of the present disclosure, the expression "rotate together with" means that related components (such as two components) may rotate together. In an embodiment where one component rotates together with the other one component, when the one component rotates, the other one component rotates also.

In some embodiments, where a gear rotates together with a shaft, when the gear rotates, the relative rotates together; alternatively, when the shaft rotates, the relative gear rotates also.

In some embodiments, where one shaft rotates together with the other shaft, when one shaft rotates, the other shaft rotates also.

In some embodiments, where one gear rotates together with the other one gear, when the one gear rotates, the other one gear rotates also.

In the following description, the expression "rotate together with" may be understood as described above, unless specified or limited otherwise.

In some embodiments, the first motor generator 51 may be configured to rotate together with the motor power shaft 3. For example, when functioning as a motor, the first motor generator 51 outputs the power to the motor power shaft 3. In some embodiments, when functioning as a generator, power from the motor power shaft 3 may be transmitted to the first motor generator 51, thereby driving the first motor generator 51 to generate electric power.

In the specification of the present disclosure, a motor generator (such as the first motor generator 51) may be understood as an apparatus which can function as a motor and a generator, unless specified or limited otherwise.

In some embodiments, the motor power shaft 3 may rotate together with one of the output shafts, such as the second output shaft 22. In some embodiments, when the motor power shaft 3 is rotating together with the one of the output shafts, the first motor generator 51 may use at least a part of power output by the engine 4 so as to generate electric power when the vehicle is parking or running.

In some embodiments, when the vehicle is in a running state and the motor power shaft 3 is rotating together with one of the output shafts, a part of power output by the engine 4 may be transmitted to the first motor generator 51 via the motor power shaft 3 such that the first motor generator 51 is driven to generate electric power, thus accomplishing a condition of charging the vehicle battery while driving the vehicle. In some embodiments, when the vehicle is in a parking state (e.g., the vehicle stops running but the engine is still working) and the motor power shaft 3 is rotating together with one of the input shafts, a part of power output by the engine 4 may be transmitted to the first motor generator 51 via the motor power shaft 3 such that the first motor generator 51 is driven to generate electric power, thus accomplishing a condition of charging the vehicle while parking (such as charging the vehicle while the vehicle is not running).

In some embodiments, the motor power shaft 3 may be a motor shaft of the first motor generator 51. In some embodiments, the motor power shaft 3 may be a shaft different from the motor shaft of the first motor generator 51.

With the power transmission system 100 according to embodiments of the present disclosure, the number of charging modes of the vehicle can be increased. For example, the charging of a vehicle battery can take place either when the vehicle is running or when the vehicle is parked. Therefore, different charging modes can be provided, and charging efficiency can be improved.

The detailed configuration of the transmission unit 101 may be described in detail below with reference to detailed embodiments as shown in FIGS. 1-6.

In some embodiments, as shown in FIGS. 1-6, the output unit may rotate with one of the output shafts, such as the second output shaft 22, at a different speed. In other words, the output unit 221 and the corresponding output shaft may rotate at different speeds independently.

In some embodiments, the output unit 221 may selectively engage one of the output shafts and rotate together with the output shaft. In other words, the output unit 221 may engage one of the output shafts and rotate together with the output shaft thereof. In some embodiments, the output unit 221 and one of the output shafts may rotate at different speeds.

In some embodiments, as shown in FIGS. 1-6, the output unit 221 may fit over one of the output shafts without particular limits in the present disclosure. In some embodiments, as shown in FIGS. 1-5, the output unit 221 may fit over the second output shaft 22. In other words, the output unit 221 and the second output shaft 22 may rotate at different speeds.

In some embodiments, as mentioned above. Corresponding output unit synchronizers 221c may configure to synchronizing the output unit 221 with one of the output shafts.

In some embodiments, the output unit synchronizer 221c may dispose on one of the output shafts and engage the output unit 221. In other words, as shown in FIG. 1, when the output unit synchronizer 221c is in a disengaged state, the output unit 221 and the second output shaft 22 may rotate at different speeds. When the output unit synchronizer 221c is in an engaged state, the output unit 221 may rotate together with the second output shaft 22.

In some embodiments, the output unit 221 may be an output idler gear, and the output idler gear 221 may fit over one of the output shafts. The output idler gear 221 may mesh with the shift driven gear 74 of a main reducer. In the present embodiments, the output unit synchronizer 221c may be the output idler gear 221c, and the output idler gear 221c may configure to synchronize the output idler gear 221 with one of the output shafts, such as the second output shaft 22.

It should be noted that the output idler gear 221 as the output unit 221 and the output idler gear 221c as the output unit synchronizer 221c are being applied in specific cases may be schematic examples provided for better understanding the present disclosure, which may not be construed a limitation.

In some embodiments, the fixed output gear 211 may configure to fix on the other output shafts. In the present embodiments, the output shafts include a first output shaft 21 and a second output shaft 22. The output unit 221 may fit over the second output shaft 22, and the fixed output gear 211 may be fixed on the first output shaft 21, which may not be construed as a limitation.

The motor power shaft 3 may rotate together with one of the output shafts according to embodiments of the present disclosure may be described below with reference to FIGS. 1-6.

In some embodiments of the present disclosure, the motor power shaft 3 may rotate together with one of the output shafts via a gear pair. The gear mechanism has simple structure and is convenient for using in power transmission. In addition, with the gear mechanism, a required transmission ration may be obtained and the power transmission may be reliable. The gear pair may include two meshed gears, a generator gear 73 and a motor power shaft gear 31.

In some embodiments, the generator gear 73 may be fixed on one of the output shafts. In other words, the generator gear 73 is fixed on an output shaft. The output shaft and the output unit 221 may rotate at different speeds or rotate together with each other. In some embodiments, the generator gear 73 may be fixed on the second output shaft 22 without particular limits in the present disclosure. The motor power shaft gear 31 may be disposed on the motor power shaft 3, and the motor power shaft gear 31 may configure to mesh with the generator gear 73. In other words, power may transmit from the motor power shaft gear 31 to the generator gear 73.

A reverse unit of the power transmission system 100 according to embodiments of the present disclosure may be described below in detail.

In some embodiments, the reverse unit includes a reverse output gear 72 and a reverse idler gear. The reverse output gear 72 may configure to rotate together or disengage from one of the shift driving gears, such as a shift driving gear 2a. In some embodiments, the reverse output gear 72 may rotate together with the shift driving gear, the power generated by the engine 4 and/or the power generated by the first motor generator 51 may transmit to the reverse output gear 72. In some embodiments, the reverse output gear 72 may disengage from the shift driving gear, and power may not transmit to the reverse output gear 72.

In some embodiments, the reverse output gear 72 may selectively rotate together with the shift driving gear via reverse idler gears, such as a first reverse idler gear 711, a second reverse idler gear 712 and a third reverse idler gear 713.

In the present embodiments, the reverse idler gear may configure to rotate together with one of the shift driven gears and the reverse output gear may selectively rotate together with the reverse idler gear. In other words, in some embodiments, the reverse output gear 72 may rotate together with the reverse idler gear, the power generated by the engine 4 and/or the power generated by the first motor generator 51 may transmit to the reverse output gear 72. In some embodiments, the reverse output gear 72 may disengage from the reverse idler gear, and power may not transmit to the reverse output gear 72.

In some embodiments, the reverse output gear 72 may synchronize with the reverse idler gear via the reverse synchronizer 72c. In the embodiments of the present disclosure, the reverse output gear 72 may configure to rotate together with the reverse idler gear via a synchronization of the reverse synchronizer 72. In some embodiments, the reverse output gear 72 and the reverse idler gear may rotate at different speeds when the reverse synchronizer 72c is in a disengage state.

In some embodiments, the reverse synchronizer 72c and the output unit synchronizer 221c may share a shift fork mechanism. The reverse synchronizer 72c may synchronize the reverse output gear 72 with the reverse idler gear. At the same time, the output unit synchronizer 221c is in a disengaged state. The output unit synchronizer 221c may synchronize the output unit 21 with one of the output shafts. At the same time, the reverse synchronizer 72c is in a disengaged state. In some embodiments, as shown in FIG. 1, the engaging sleeve of the reverse synchronizer 72c may move to right to engage the third reverse idler gear 713, and the output unit synchronizer 221c is in a disengaged state. In some embodiments, the engaging sleeve of the output unit synchronizer 221c may move to the left to engage the output unit 221, and the reverse synchronizer 72c is in a disengaged state.

Therefore, both of the synchronization of the reverse synchronizer 72 and the output unit synchronizer 221c can be controlled by one shift fork mechanism. The number of the shift fork mechanisms can be saved, and the power transmission system 100 can have a more compact structure, a smaller axial and diametric size, and thus more convenient to arrange on vehicles.

In some embodiments, as shown in FIGS. 1-5, the reverse idler gear may include the first reverse idler gear 711, the second reverse idler gear 712 and the third reverse idler gear 713. Specially, the first reverse idler gear 711 may configure to mesh with one of the shift driving gears, such as the second-gear shift driving gear 2a. The first reverse idler gear 711 may rotate together with the second reverse idler gear 712 in the same direction and the same velocity. The second reverse idler gear 712 may rotate together with the third reverse idle gear 713, and the reverse synchronizer 72c may configure to selectively synchronize the reverse output gear 72 with the third reverse idler gear 713.

In some embodiments, the reverse output gear 72 and the third reverse idler gear 713 may be arranged coaxially. The reverse synchronizer 72c may be disposed on the reverse output gear 72 to engage with the third reverse idler gear 713 or the reverse synchronizer 72c may be disposed on the third reverse idler gear 713 to engage with the reverse output gear 72. In some embodiments of the present disclosure, as shown in FIGS. 1-5, both of the reverse output gear 72 and the third reverse idler gear 713 are fitted over the motor power shaft 3, such that the reverse shaft can be saved and the transmission unit 101 can have a more compact structure. In some embodiments, the reverse synchronizer 72c may be disposed on the reverse output gear 72 to engage the third reverse idler gear 713, which may not be construed as a limitation.

In some embodiments, as shown in FIGS. 1-6, the first reverse idler gear 711 and the second reverse idler gear 712 may form an integrated structure so as to be a joint gear structure, such that the axial size of the first reverse idler gear 711 and the second idler gear 712 may be reduced and arranged on vehicles more conveniently.

The input shaft(s), the output shaft(s), the shift driving gears and the shift driven gears of the power transmission system 100 will be described below with reference to embodiments shown in FIGS. 1-6.

In some embodiments, as shown in FIGS. 1-5, two input shafts are provided. In the present embodiment, the plurality of input shafts includes a first input shaft 11 and a second input shaft 12. The second input shaft 12 may be hollow and the first input shaft 11 may be solid. One part of the first input shaft 11 may be inserted within the second input shaft 12, and the other part of the first input shaft 11 may extend out of the second input shaft 12 along an axial direction of the second input shaft 12. The first input shaft 11 and the second input shaft 12 may be arranged coaxially.

In some embodiments, two output shafts are provided. In the present embodiment, the plurality of output shafts may include a first output shaft 21 and a second output shaft 22. The first output shaft 21 and the second output shaft 22 may be arranged coaxially with the input shafts (such as the first input shaft 11 and the second input shaft 12). Both the first output shaft 21 and the second output shaft 22 may be solid.

In some embodiments, the power transmission system 100 according to embodiments of the present disclosure may have six gear transmission types. Specifically, odd number-gear shift driving gears may be arranged on the first input shaft 11, while even number-gear shift driving gear may be arranged on the second input shaft 12. The first input shaft 11 may transmit power from gear pairs of odd-numbered gear, and the second input shaft 12 may transmit power from gear pairs of even-numbered gear.

In some embodiments, as shown in FIGS. 1-5, a first-gear shift driving gear 1a, a third-gear shift driving gear 3a and a fifth-gear shift driving gear 5a may be arranged on the first input shaft 11, and a second-gear shift driving gear 2a and a fourth-sixth-gear shift driving gear 46a may be arranged on the second input shaft 12. Each of the first-gear to fourth-sixth-gear shift driving gears 1a, 2a, 3a, 46a, and 5a may rotate together with a corresponding input shaft.

In some embodiments, a first-gear shift driven gear 1b, a second-gear shift driven gear 2b, a third-gear shift driven gear 3b and a fourth-gear shift driven gear 4b may be disposed on the first output shaft 21, and a fifth-gear shift driven gear 5b and a sixth-gear shift driven 6b may be disposed on the second output shaft 22. Each of the shift driven gears 1b, 2b, 3b, 4b, 5b and 6b may be fitted over a corresponding output shaft. Each of the shift driven gears and the corresponding output shafts thereof may rotate at different speeds.

In some embodiments, the first-gear shift driving gear 1a may mesh with the first-gear shift driven gear 1b to form one gear pair, the second-gear shift driving gear 2a may mesh with the second-gear shift driven gear 2b to form one gear pair, the third-gear shift driving gear 3a may mesh with the second-gear shift driven gear 3b to form one gear pair, the fourth-sixth-gear shift driving gear 46a may mesh with the fourth-gear shift driven gear 4b to form one gear pair, the fifth-gear shift driving gear 5a may mesh with the fifth-gear shift driven gear 5b to form one gear pair, and the fourth-and-sixth-gear shift driving gear 46a may mesh with the fifth-gear shift driven gear 6b to form one gear pair and six pairs of gear pairs can be formed.

In the present embodiment, the fourth-gear gear pair and the sixth-gear gear pair share the fourth-sixth shift driving gear 46a, so that the number of shift driving gears can be reduced to make the power transmission system 100 have a more compact structure.

As the shift driven gear is fitted over the corresponding output shaft, a synchronizer is provided to synchronize the shift driven gear and the corresponding output shaft, thus achieving the object of power transmission.

In some embodiments, as shown in FIGS. 1-5, the power transmission system 100 includes a first-third gear synchronizer 13c, a second-fourth gear synchronizer 24c, and a fifth-sixth gear synchronizer 56c.

In some embodiments, as shown in FIG. 1, the first-third gear synchronizer 13c is disposed on the first output shaft 21 and between the first-gear shift driven gear 1b and the third-gear shift driven gear 3b. The first-third gear synchronizer 13c may engage the first output shaft 21 with the first-gear shift driven gear 1b or the third-gear shift driven gear 3b, such that the shift driven gear may rotate together with the corresponding output shaft, e.g., the first-gear shift driven gear 1b and may rotate together with the first output shaft 21, and the third-gear shift driven gear 3b and may rotate together with the first output shaft 21.

In some embodiments, as shown in FIG. 1, the first-third gear synchronizer 13c includes an engaging sleeve. In some embodiments, the engaging sleeve of the first-third gear synchronizer 13c may move to the left so as to engage the third-gear shift driven gear 3b with the first output shaft 21, such that the third-gear shift driven gear 3b may rotate together with the first output shaft 21. In some embodiments, the engaging sleeve of the first-third gear synchronizer 13c may move to the right so as to engage first-gear shift driven gear 1b with the first output shaft 21, such that the first-gear shift driven gear 1b may rotate together with the first output shaft 21.

In some embodiments, as shown in FIG. 1, the second-fourth gear synchronizer 24c is disposed on the first output shaft 21 and between the second-gear shift driven gear 2b and the fourth-gear shift driven gear 4b. The second-fourth gear synchronizer 24c may engage the second-gear shift driven gear 2b with the first output shaft 21 or engage the fourth-gear shift driven gear 4b with the first output shaft 21, such that the shift driven gear may rotate together with the corresponding output shaft, e.g. the second-gear shift driven gear 2b may rotate together with the first output shaft 21, and the fourth-gear shift driven gear 4b may rotate together with the first output shaft 21.

In some embodiments, as shown in FIG. 1, the second-fourth gear synchronizer 24c includes an engaging sleeve. In some embodiments, the engaging sleeve of the second-fourth gear synchronizer 24c may move to the left so as to engage the second-gear shift driven gear 2b with the first output shaft 21, such that the second-gear shift driven gear 2b may rotate together with the first output shaft 21. In some embodiments, the engaging sleeve of the second-fourth gear synchronizer 24c may move to the right so as to engage fourth-gear shift driven gear 4b with the first output shaft 21, such that the fourth-gear shift driven gear 4b may rotate together with the first output shaft 21.

In some embodiments, as shown in FIG. 1, the fifth-sixth gear synchronizer 56c is disposed on the second output shaft 22 and between the fifth-gear shift driven gear 5b and the sixth-gear shift driven gear 6b. The fifth-sixth gear synchronizer 56c may engage the fifth-gear shift driven gear 5b with the second output shaft 22 or engage the sixth-gear shift driven gear 6b with the second output shaft 22. The fifth-sixth gear synchronizer 56c includes an engaging sleeve. In some embodiments, the engaging sleeve of the fifth-sixth gear synchronizer 56c may move to the left so as to engage the sixth-gear shift driven gear 6b with the second output shaft 22, such that the sixth-gear shift driven gear 6b may rotate together with the second output shaft 22. In some embodiments, the engaging sleeve of the fifth-sixth gear synchronizer 56c may move to the right so as to engage fifth-gear shift driven gear 5b with the second output shaft 22, such that the fifth-gear shift driven gear 5b may rotate together with the second output shaft 22.

In some embodiments of the present disclosure, the engine 4 may transmit power to, or disengage from, the first input shaft 11 and the second input shaft 12 via a dual clutch 2d.

In some embodiments of the present disclosure, as shown in FIGS. 1-5, the dual clutch 2d includes an input terminal 23d, a first output terminal 21d and a second output terminal 22d. The engine 4 is connected with the input terminal 23d of the dual clutch 2d. In some embodiments, the engine 4 is connected with the input terminal 23d by at least one selected from a group consisting of a flywheel, a damper, a torsional disk, etc.

In some embodiments, the first output terminal 21d is connected with the first input shaft 11, such that the first output terminal 21d may rotate together with the first input shaft 11. In some embodiments, the second output terminal 22d is connected with the second input shaft 12, such that the second output terminal 22d may rotate together with the second input shaft 12.

In some embodiments, the input terminal 23d may include a shell of the dual clutch 2d, and each of the first output terminal 21d and the second output terminal 22d may include one driven disk of the dual clutch 2d. In some embodiments, the shell is disengaged from the driven disk, i.e., the input terminal 23d is disengaged from the first output terminal 21d and is disengaged from the second output terminal 22d. When the shell is to be engaged with one driven disk, the shell can be controlled to engage with a corresponding driven disk, thus the shell and this driven disk may rotate together. In the present embodiment, the input terminal 23d may engage with one of the first output terminal 21d and the second output terminal 22d to transmit power from the input terminal 23d to one of the first output terminal 21d and the second output terminal 22d, to output the transmitted power.

In some embodiments, the shell may be engaged with two driven disks simultaneously. In the present embodiment, the input terminal 23d is engaged with both the first output terminal 21d and the second output terminal 22d, and thereby power from the input terminal 23d may be transmitted to the first output terminal 21d and the second output terminal 22d so as to be output.

A person with ordinary skill in the art will appreciate that the engaging state of the dual clutch 2d may be controlled according to practical condition, and that the engaging state may also be adjusted accordingly based on a current transmission mode. In some embodiments, the input terminal 23d may disengage from the two output terminals including, for example, the first output terminal 21d and the second output terminal 22d. In some embodiments, the input terminal 23d may engage with at least one of the two output terminals including, for example, the first output terminal 21d and the second output terminal 22d.

In some embodiments, the power transmission system 100 further includes three power output shafts, i.e., a first output shaft 21, a second output shaft 22, and a motor power shaft 3. These power output shafts, a differential 75, and relationships therebetween may be described below in detail with reference to FIGS. 1-5.

In some embodiments, the differential 75 may be disposed between a pair of front wheels 76 of the vehicle. In some embodiments, the differential 75 may be disposed between a pair of rear wheels 77 of the vehicle. The differential 75 may drive the wheels to the left or to the right when the vehicle is turning or running on a rough road, such that the wheels may roll with different angular speeds, and therefore driving wheels at both sides of the vehicle may perform only rolling on the ground. In some embodiments, a shift driven gear 74 of a main reducer may be disposed on the differential 75, for example, the shift driven gear 74 may be disposed on a shell of the differential 75. In some embodiments, the shift driven gear 74 may be a bevel gear, which may not be construed a limitation.

In some embodiments, as mentioned above, the fixed output gear 211 and the output unit 221, i.e. the output idler gear 221, may output the power transmitted to the output shafts, such that both of the fixed output gear 211 and the output unit may mesh with the shift driven gear of a main reducer.

In some embodiments, as the output reverse output gear 72 may output the reverse power, the reverse output gear 72 may mesh with the shift driven gear 74.

The power transmission system 100 according to embodiments of the present disclosure may be used in various different conditions, such as a parking-charging condition (for example, charging the vehicle while the vehicle is parking), a running-charging condition (for example, charging the vehicle while the vehicle is running and both clutch parts of dual clutch 2d are engaged), and the reverse mode.

In the parking-charging condition, the engine 4 is configured to generate power and output the power to the first motor generator 51 via the generator gear 73 and the motor power shaft gear 31, thereby driving the first motor generator 51 to generate electric power.

In some embodiments, as shown in FIGS. 1-5, in the parking-charging state, the engine 4 generates power and transmits the power to the second output shaft 22 via the first input shaft 11, one component of the fifth-gear gear pair and the second input shaft 12 therebetween and the six-gear gear pair sequentially. The first motor generator 51 may be driven to generate electric power as a generator by the power generated by the engine 4 transmitted by the generator gear 73, the motor power shaft gear 31 and the motor power shaft 3 sequentially.

Therefore, charging the vehicle when the vehicle is parking may be achieved, and the number of charging modes is increased. In the parking-charging mode, the vehicle is not running, all power from the engine 4 may be used to charge the vehicle, thus providing a fast charging performance and enhancing the charging efficiency.

In the running-charging condition, the input terminal 23d is engaged with the first output terminal 21d and engaged with the second output terminal 22d simultaneously, a part of power generated by the engine 4 may be output to one of the output shafts to drive the wheels of the vehicle, and the other part of power may be transmitted to the first motor generator 51 via the generator gear 73 and the motor power shaft gear 31, thus driving the first motor generator 51 to generate electric power.

In the running-charging condition, as shown in FIGS. 1-5, a part of power generated by the engine 4 may be transmitted to the first motor generator 51 via the first input shaft 11, the fifth-gear gear pair, the generator gear 73 and the motor power shaft gear 31 sequentially, thus driving the first motor generator 51 to generate electric power. The other part of the power generated by the engine 4 may be output via the second input shaft 12 and one component of the second-gear gear pair and the fourth-gear gear pair therebetween.

In the running-charging condition, as shown in FIG. 1, a part of power generated by the engine 4 may be transmitted to the first motor generator 51 via the second input shaft 12, the sixth-gear gear pair, the generator gear 73 and the motor power shaft gear 31 sequentially, thus driving the first motor generator 51 to generate electric power. The other part of the power generated by the engine 4 may be output via the first input shaft 11 and one component of the first-gear gear pair and the third-gear gear pair therebetween.

It is known to those skilled in the art that a conventional dual clutch generally has two gear parts, and only one gear part is used when the dual clutch is working. In the power transmission system 100 according to embodiments of the present disclosure, however, two gears parts of the dual clutch 2d may be both engaged (for example, the input terminal 23d is engaged with the first output terminal 21d and engaged with the second output terminal 22d simultaneously) when the dual clutch 2d is working. In the present embodiment, a part of power from the engine 4 may be output to wheels of the vehicle via one output shaft to drive the vehicle to run, and the other part of power from the engine 4 may be transmitted to the first motor generator 51 to drive the first motor generator 51 to generate electric power. In this way, transmission modes of the vehicle are increased, and charging the vehicle while the vehicle is running may be achieved.

In the power transmission system 100 according to embodiments of the present disclosure, a mechanical reverse mode, an electric reverse mode and a hybrid (both mechanic and electric) reverse mode may be achieved.

In the mechanical reverse mode, the reverse of the vehicle is accomplished with power from the engine 4. Specifically, the engine 4 generates power and transmits the power to the reverse idler gear, and then transmits to the reverse output gear 72 via synchronization of reverse synchronizer 72c (synchronizing the reverse idler gear).

In the mechanical reverse mode, as shown in FIG. 1, power generated by the engine 4 may transmit to the third reverse idler gear 713 via the second input shaft 12, the first reverse idler gear 711 and the second reverse idler gear 712. The engaging sleeve of the reverse synchronizer 72c may move to the right to engage with the third reverse idler gear 713, thus transmitting the power generated by the engine 4 to the reverse output gear 72 via the reverse idler gear.

In the mechanical reverse mode, as shown in FIG. 1, the reverse synchronizer 72c may engage with the third reverse idler gear 713.

In the electric reverse mode, the reverse of the vehicle can be enabled with power from the first motor generator 51. Specifically, the first motor generator 51 may generate power and transmit the power to an output shaft via the generator gear 73, so as to be output. The generator gear 73 may dispose on the output shaft. In some embodiments, as shown in FIGS. 1-5, the output unit synchronizer 221c may engage with the output unit 221. Power generated by the first motor generator 51 may transmit to the output unit 221 via the motor power shaft gear 31, the generator gear 73 and the second output shaft 22, so as to be output. Only the output unit synchronizer 221c is in an engaged state in this transmission passage.

In some embodiments, the first motor generator 51 may generate power and transmit the power to the reverse output gear 72 via the reverse idler gear and a synchronization of the reverse synchronizer 72c. In some embodiments, as shown in FIGS. 1-5, the output unit synchronizer 221c may disengage from the output unit 221, and the fifth-sixth gear synchronizer 56c may engage with the sixth-gear shift driven gear 6b, at the same time, the reverse synchronizer 72c may engage with the third reverse idler gear 713, thus transmitting power generated by the first motor generator 51 to reverse output gear 72 via the motor power shaft gear 31, the generator gear 73, the sixth-gear gear pair, the second input shaft 12 and the reverse idler gear, so as to be output. The reverse synchronizer 72c is in an engaged state and the fifth-sixth gear synchronizer 56c may engage with the sixth-gear shift driven gear 6b in this transmission passage.

In the hybrid reverse mode, the reverse of the vehicle may be achieved with the engine 4 and the first motor generator 51. The hybrid reverse mode may be a combination of the above mechanical reverse mode and the electric reverse mode.

In the hybrid reverse mode, the engine 4 may generate first power and transmit the first power to the reverse idler gear, and then the first power may be transmitted to the reverse output gear 72 via a synchronization of the reverse synchronizer 72c (synchronizing the reverse idler gear), so as to be output.

In addition, the first motor generator 51 may generate second power and transmit the second power to the reverse idler gear via the generator gear 73, and then the second power may be transmitted to reverse output gear 72 via a synchronization of the reverse synchronizer 72c. The reverse synchronizer 72c is in an engaged state and the fifth-sixth gear synchronizer 56c may engage with the sixth-gear shift driven gear 6b in this transmission passage.

In some embodiments as shown in, for example, FIG. 1, when the power transmission system 100 in the hybrid reverse mode, combines the above mechanical reverse mode and the electric reverse mode. The engine 4 may transmit the first power to the second input shaft 12 as the above mechanical reverse mode described. The first motor generator 51 may transmit the second power to the second output shaft 12 as the above electric reverse mode described. The first power and the second power may be coupled together before being output to the wheels. In some embodiments, the first power and the second power may be coupled at the second input shaft 12, and the coupled power may be transmitted to the wheels via the reverse idler gear and the reverse output gear 72 so as to reverse the vehicle.

In the hybrid reverse mode, the first motor generator 51 may adjust the speed, such that the second input shaft 12 may synchronously receive the first power from the engine 4 and the second power from the first motor generator 51, to provide a smooth and harmonious power transmission.

As described, with the power transmission system 100 according to embodiments of the present disclosure, three reverse modes including the mechanical reverse mode, the electric reverse mode and the hybrid reverse mode may be achieved, thus increasing the reverse modes and facilitating a user to shift within the three reverse modes according to a practical condition, and therefore different driving requirements may be satisfied.

When the vehicle has sufficient electric power, the electric reverse mode may be used. In the electric reverse mode, harmful exhaust gases can be reduced, and the energy consumption can be reduced. It is known to those skilled in the art that an unskilled driver will take longer time and more maneuvers to park the vehicle at a predetermined position. Considering that the engine 4 may generate more harmful gases during a low-speed reverse process and that the engine 4 has relatively higher fuel consumption, because the engine is at an uneconomical rotating speed during the reverse process, the electric reverse mode of the present disclosure is highly effective in reducing fuel consumption during such a low-speed reverse process. In addition, with the generator being used as a power source, harmful exhaust gases can be minimized, and the energy consumption in a low-speed reverse process can also be decreased. Therefore, the fuel economy of the engine 4 may be enhanced.

When the vehicle has insufficient or relatively less electric power, the mechanical reverse mode may be used. In a case that the vehicle needs to be reversed quickly or that the vehicle needs to be reversed with a larger power, the hybrid reverse mode may be used, thus enhancing the power of the vehicle and providing better driving experience to the user.

It should be noted that the above three reverse modes being applied in specific cases may be schematic examples provided for better understanding the present disclosure, which may not be construed that the described reverse mode should be applied when the vehicle is in the corresponding case. It is well known to those skilled in the art that, in a specific condition, a corresponding reverse mode may be selected according to specific requirements and a practical condition.

With the power transmission system 100 according to embodiments of the present disclosure, a number of the reverse modes of the vehicle are increased, which provide a driver more options to reverse the vehicle. In this way, the driver may be provided with more driving fun and reverse of the vehicle in different road conditions may be satisfied.

In some embodiments, the power transmission system 100 further includes a second motor generator 52. With the second motor generator 52, the power of the power transmission system 100 may be improved, and more transmission modes can be provided.

In some embodiments, the second motor generator 52 may perform power transmission with the shift driven gear 74 of the main reducer. For example, a gear may be disposed on a motor shaft of the second motor generator 52, and the gear is configured to directly mesh with the shift driven gear 74 so as to perform power transmission. In some embodiments, the second motor generator 52 is configured to connect with the first input shaft 11 or the first output shaft 21. In some embodiments, the second motor generator 52 may be integral with the differential 75. In some embodiments, the engine 4 and the first motor generator 51 are configured to drive front wheels of the vehicle, and the second motor generator 52 may be a wheel-side motor and configured to drive rear wheels. In some embodiments, the second motor generator 52 may drive the pair of rear wheels via a reducing mechanism. In some embodiments, two second motor generators 52 are provided, and each second motor generator 52 is configured to drive one rear wheel via a reducing mechanism.

In some embodiments, as shown in FIGS. 2-5, the power transmission system 100 may include an electric differential lock unit. The electric differential lock unit may lock a pair of driving wheels when the vehicle is skidding, thus enhancing the antiskid performance and the pass performance of the vehicle.

In some embodiments, as shown in FIGS. 2-5, the electric differential lock unit may include a third motor generator 201, a fourth motor generator 301 and an antiskid synchronizer 503. The engine 4 and/or the first motor generator 51 is configured to drive a first pair of wheels 76, the third motor generator 201 and the fourth motor generator 301 are configured to driven a second pair of wheels 77, the first pair of wheels 76 are one pair of the pair of front wheels and the pair of the rear wheels, and the second pair of wheels 77 are the other one pair of the pair of front wheels and the pair of the rear wheels. In some embodiments, as shown in FIGS. 2-5, the engine and the first motor generator 51 may drive the pair of front wheels, and the third motor generator 201 and the fourth motor generator 301 may drive the pair of rear wheels.

In some embodiments, as shown in Figs. 2-5, the third motor generator 201 is configured to rotate together with one of the second pair of wheels 77. In the present embodiment, the third motor generator 201 may output power to this one wheel so as to drive this one wheel to rotate. In some embodiments, power from this one wheel may be transmitted to the third motor generator 201, thus driving the third motor generator 201 to generate electric power.

In some embodiments, the fourth motor generator 301 is configured to rotate together with the other one of the second pair of wheels 77. In the present embodiment, the fourth motor generator 301 may output power to the other one wheel so as to drive the other wheel to rotate. In some embodiments, power from the other wheel may be transmitted to the fourth motor generator 301, thus driving the fourth motor generator 301 to generate electric power. In some embodiments, as shown in FIG. 2-5, the third motor generator 201 is configured to rotate together with a left rear wheel of the vehicle, and the fourth motor generator 301 is configured to rotate together with a right rear wheel of the vehicle. This embodiment is provided as an example, and the present disclosure should not be construed to be limited by this embodiment.

In some embodiments, the antiskid synchronizer 503 is configured to selectively synchronize the second pair of wheels 77, such that the second pair of wheels 77 may rotate together. In the present embodiment, the antiskid synchronizer 503 may synchronize the second pair of wheels 77, i.e., the antiskid synchronizer 503 is in an engaged state, such that the second pair of wheels 77 may form a fixed engagement. In this way, the second pair of wheels 77 may rotate together, without rotating at different rotating speeds.

In some embodiments, when the antiskid synchronizer 503 is in a disengaged state, and the third motor generator 201 and the fourth motor generator 301 may drive corresponding wheels respectively, such that the corresponding wheels may rotate at different rotating speeds, thus the object that different wheels rotates at different speeds may be achieved. In some embodiments, when the antiskid synchronizer 503 is in a disengaged state, the third motor generator 201 and the fourth motor generator 301 may drive the second pair of wheels 77 to rotate at a same rotating speed.

With the power transmission system 100 according to embodiment of the present disclosure, the third motor generator 201 and the fourth motor generator 301 are provided and configured to drive the second pair of wheels 77 respectively, and therefore the second pair of wheels 77 rotating at different rotating speeds may be achieved. When one of the second pair of wheels 77 is skidding, the antiskid synchronizer 503 may synchronize the second pair of wheels 77 such that the second pair of wheels 77 rotate together. In this way, powers output by two motors (for example, the third motor generator 201 and the fourth motor generator 301) or one motor (for example, the third motor generator 201 or the fourth motor generator 301) may be coupled to drive the second pair of wheels 77 together, thus enhancing the antiskid capability and passing performance of the vehicle.

The power transmission system 100, according to embodiments of the present disclosure, includes the antiskid synchronizer 503, and therefore a mechanical self-locking differential mechanism commonly used in an axle (such as a rear axle) a conventional power transmission system may be avoided. In addition to the functions of the antiskid synchronizer 503 itself, the function of a mechanical self-locking differential mechanism is performed by the antiskid synchronizer 503, and therefore the power transmission system 100 according to embodiments of the present disclosure may have a more compact structure and relatively lower cost.

The third motor generator 201, the fourth motor generator 301, and transmission method thereof will be described below in detail with references to FIGS. 2-5.

Figure 2:
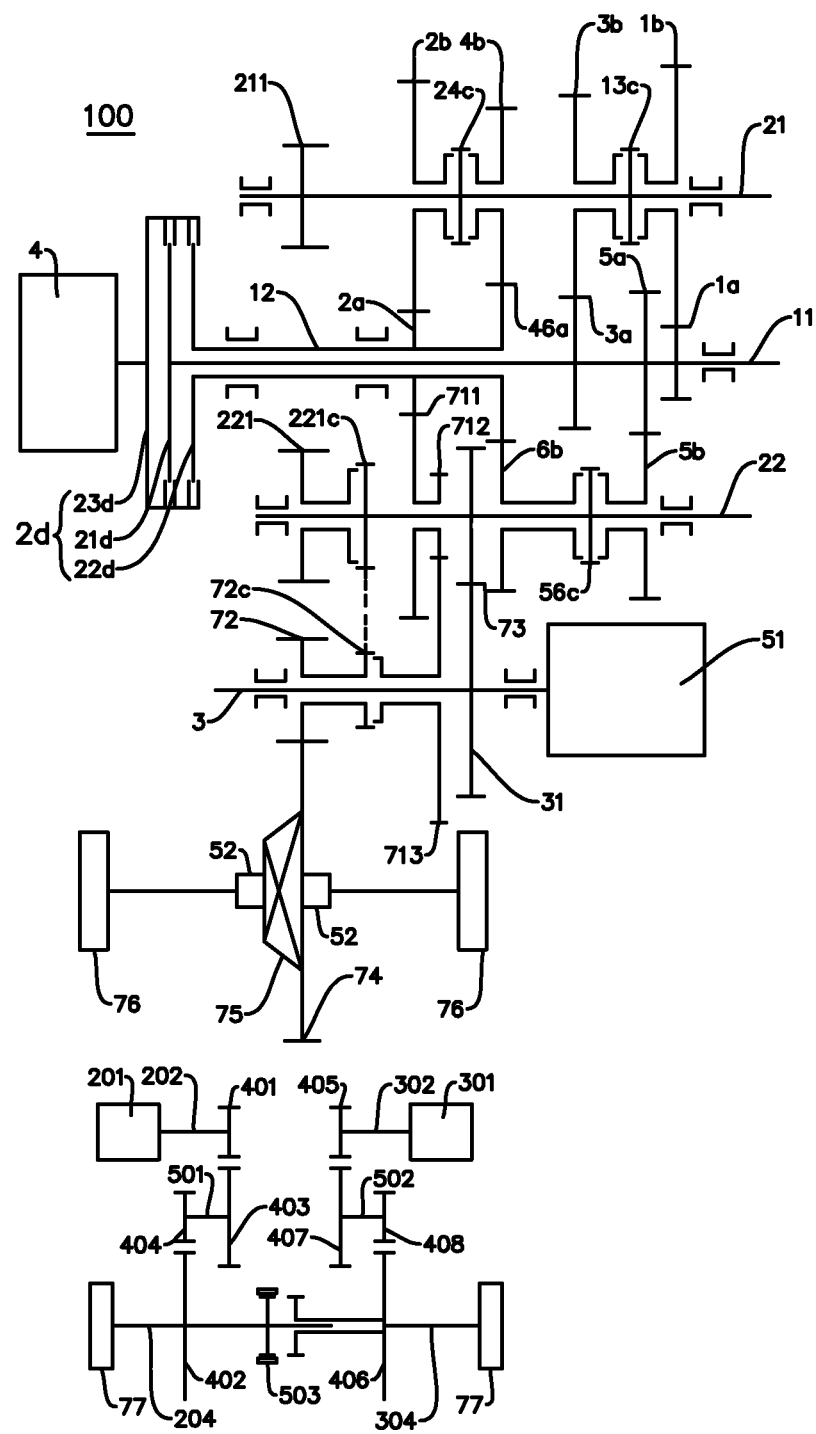
FIG. 2 is a schematic view of an exemplary power transmission system according to an embodiment of the present disclosure.
Figure 3:
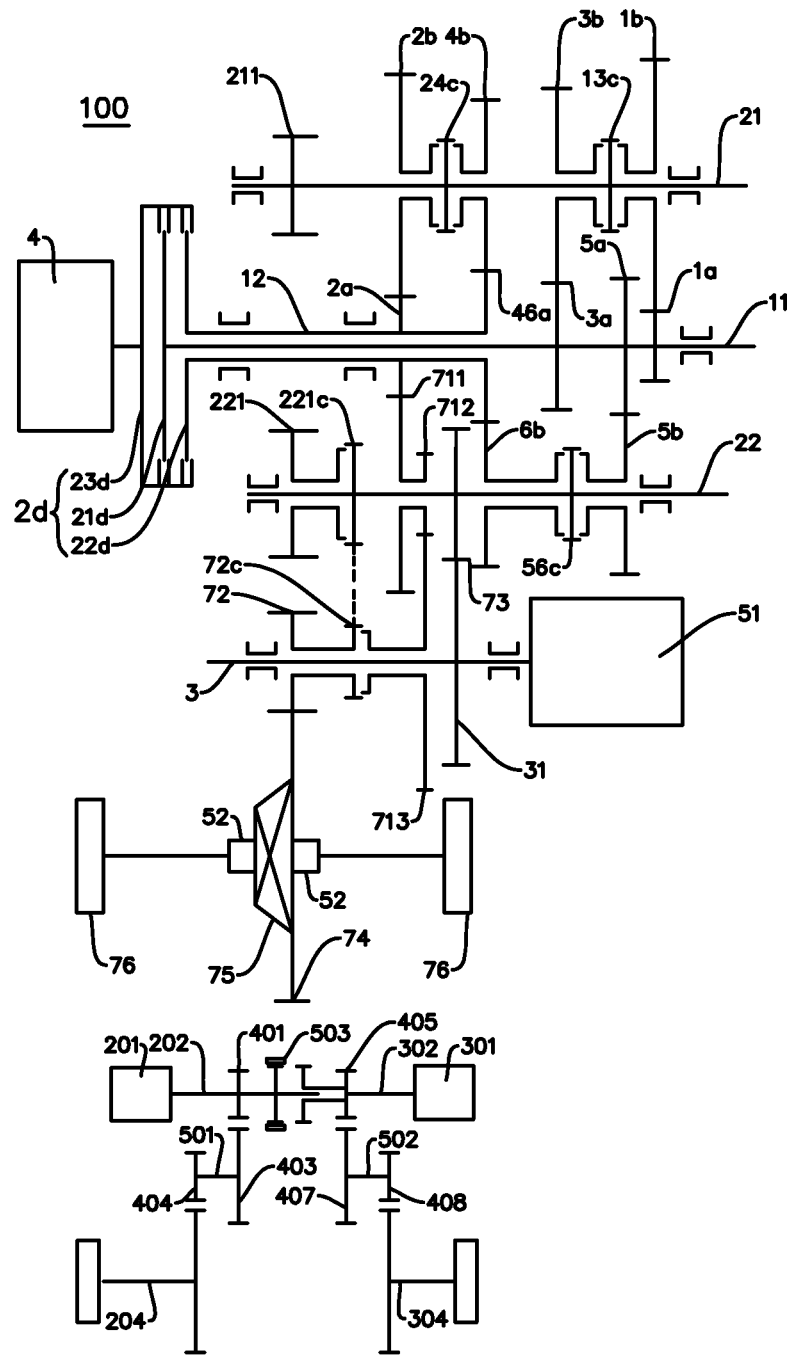
FIG. 3 is a schematic view of an exemplary power transmission system according to an embodiment of the present disclosure.
Figure 4:
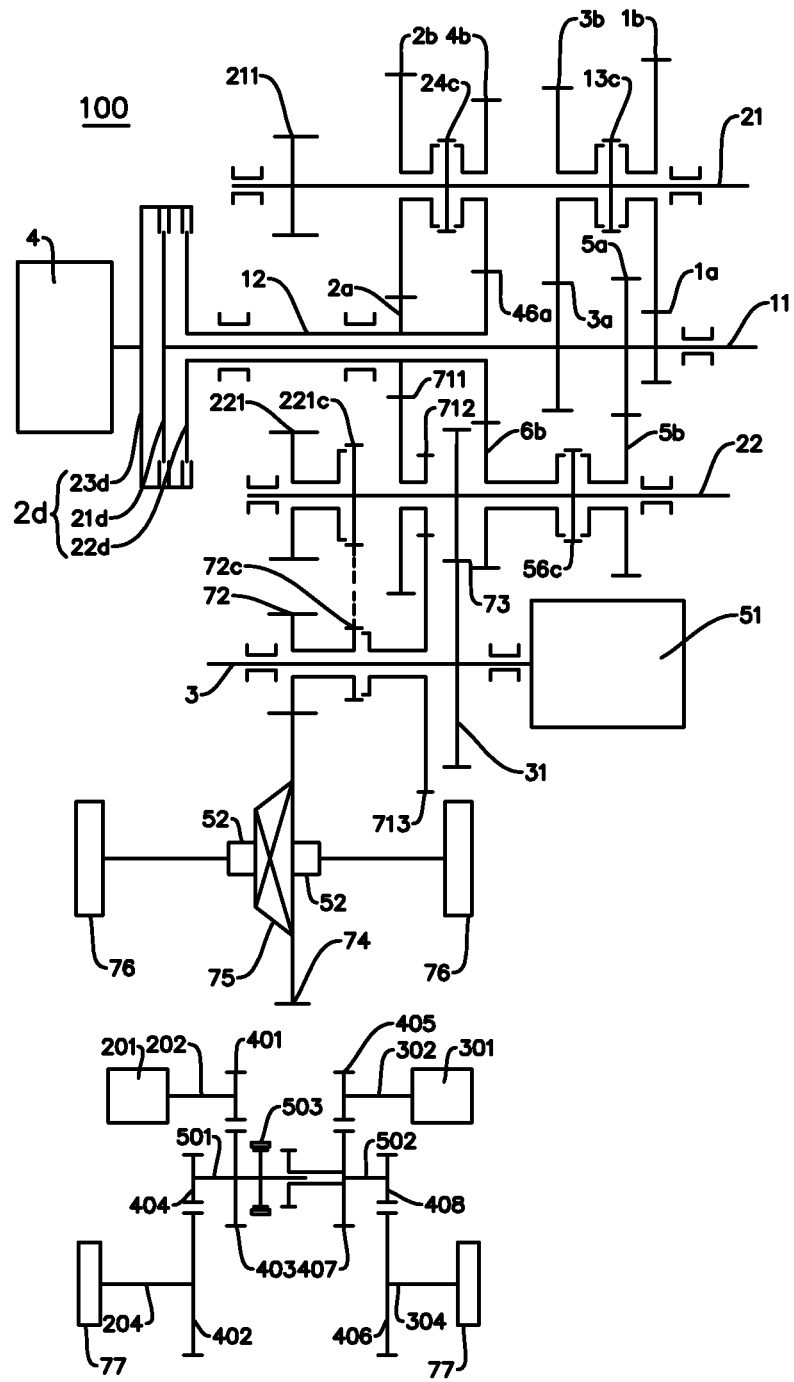
FIG. 4 is a schematic view of an exemplary power transmission system according to an embodiment of the present disclosure.

In some embodiments, as shown in FIGS. 2-4, the third motor generator 201 may perform power transmission with the corresponding wheel via a gear mechanism. In some embodiments, the fourth motor generator 301 may perform power transmission with the corresponding wheel via a gear mechanism.

The gear mechanism has a simple structure and is convenient for use in power transmission. In addition, with the gear mechanism, a required transmission ratio may be obtained and the power transmission may be reliable. In some embodiments, the third motor generator 201 and the fourth motor generator 301 may perform power transmission with corresponding wheel(s) via a same gear mechanism. In the present embodiment, the gear mechanism is common, and the power transmission system 100 may be highly symmetric, thus avoiding the center of gravity moving to one side. With one common gear mechanism, the center of gravity may be located right in the middle or substantially the middle of the two wheels, and both the stability and reliability of the power transmission system 100 may be improved.

Figure 5:
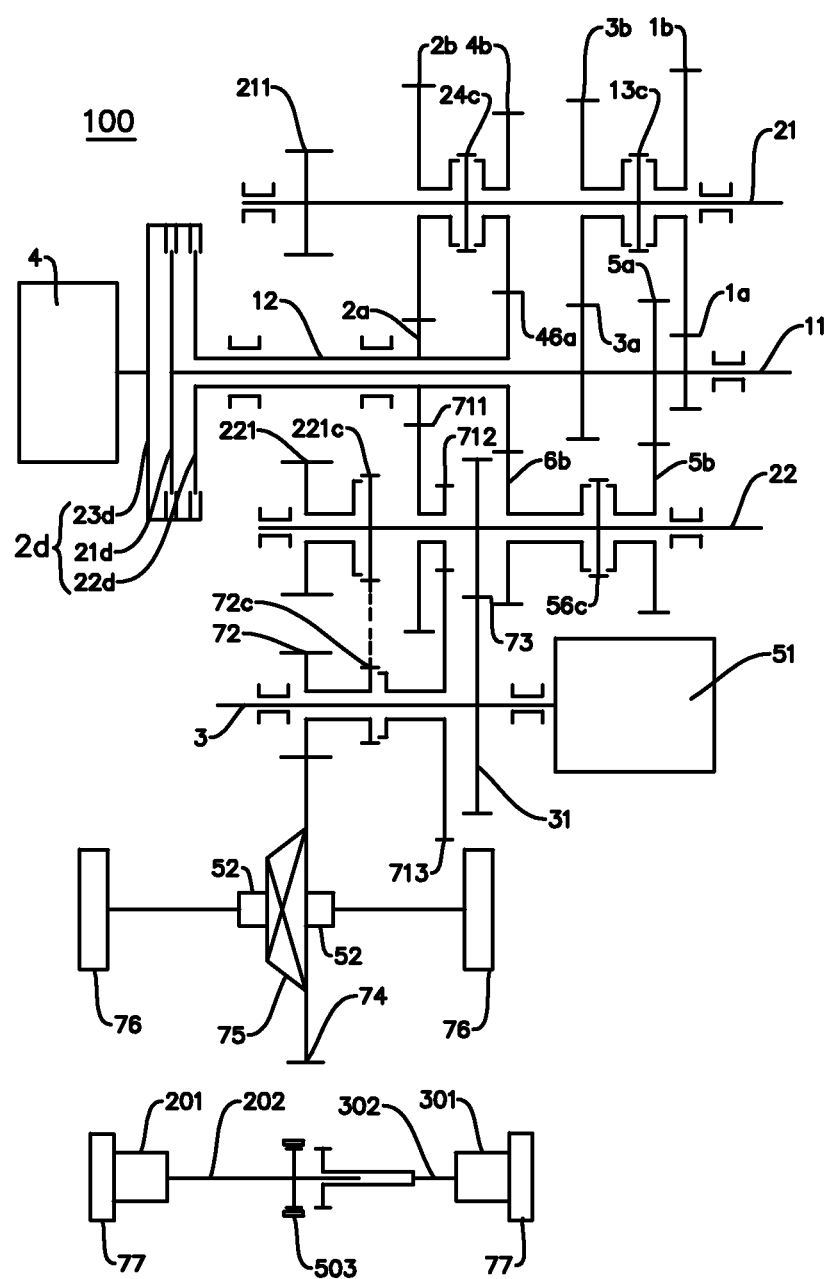
FIG. 5 is a schematic view of an exemplary power transmission system according to an embodiment of the present disclosure.

In some embodiments, as shown in FIGS. 3-5, the gear mechanism between the third motor generator 201 and the corresponding wheel may include a first gear 401, a second gear 402, a third gear 403, and a fourth gear 404.

In some embodiments, the first gear 401 may be disposed on the first output shaft 202 corresponding to the third motor generator 201, and the first gear 401 is configured to rotate together with the first output shaft 202. In some embodiments, the first output shaft 202 may output power generated by the third motor generator 201. In some embodiments, the first output shaft 202 may transmit power generated by the corresponding wheel to the third motor generator 201. In some embodiments, the first output shaft 202 and the third motor generator 201 may share a same motor shaft. In some embodiments, the motor shaft of the first output shaft 202 and the motor shaft of the third motor generator 201 may be two individual parts different from each other. In the present embodiment, the motor shaft of the first output shaft 202 and the motor shaft of the third motor generator 201 may be connected to each other.

In some embodiments, a first drive shaft 204 is connected with a wheel corresponding to the third motor generator 201, and the second gear 402 is disposed on the first drive shaft 204 and configured to rotate together with the first drive shaft 204. The third gear 403 and the first gear 401 are configured to mesh with each other, and the fourth gear 404 and the second gear 402 are configured to mesh with each other. The third gear 403 and the fourth gear 404 are coaxially arranged and may rotate together.

In some embodiments, as shown in FIGS. 2-4, the gear mechanism between the fourth motor generator 301 and the corresponding wheel may include a fifth gear 405, a sixth gear 406, a seventh gear 407, and an eighth gear 408. The fifth gear 405 may be disposed on the second output shaft 302 corresponding to the fourth motor generator 301, and the fifth gear 405 is configured to rotate together with the second output shaft 302. In some embodiments, the second output shaft 302 may output power generated by the fourth motor generator 301. In some embodiments, the second output shaft 302 may transmit power generated by the corresponding wheel to the fourth motor generator 301. In some embodiments, the second output shaft 302 and the fourth motor generator 301 may share one motor shaft. In some embodiments, the motor shaft of the second output shaft 302 and the motor shaft of the fourth motor generator 301 may be two individual parts different from each other. In the present embodiment, the motor shaft of the second output shaft 302 and the motor shaft of the fourth motor generator 301 may be connected to each other.

In some embodiments, a second drive shaft 304 is connected with a wheel corresponding to the fourth motor generator 301, and the sixth gear 406 is disposed on the second drive shaft 304 and configured to rotate together with the second drive shaft 304. The seventh gear 407 and the fifth gear 405 are configured to mesh with each other, and the eighth gear 408 and the sixth gear 406 are configured to mesh with each other. The seventh gear 407 and the eighth gear 408 are coaxially arranged and may rotate together.

In some embodiments, the first gear 401 and the fifth gear 405 may have a same structure, such as having the same size and a same teeth number. In some embodiments, the second gear 402 and the sixth gear 406 may have a same structure, such as having the same size and the same teeth number. In some embodiments, the third gear 403 and the seventh gear 407 may have a same structure, such as having the same size and the same teeth number. In some embodiments, the fourth gear 404 and the eighth gear 408 may have a same structure, such as having the same size and the same teeth number. Therefore, versatility of the gear mechanism may be improved.

In some embodiments, the third gear 403 and the fourth gear 404 may be fixed on the first gear shaft 501, and the seventh gear 407 and the eighth gear 408 may be fixed on the second gear shaft 502. In some embodiments, the third gear 403 and the fourth gear 404 may form a substantial ladder shape or a joint gear structure. In some embodiments, the seventh gear 407 and the eighth gear 408 may form a substantial ladder shape or a joint gear structure.

In some embodiments, as shown in FIG. 2, the antiskid synchronizer 503 may be disposed on the first drive shaft 204 and configured to selectively engage with the sixth gear 406. In some embodiments, a gear ring may be provided on a side of the sixth gear 406 facing the antiskid synchronizer 503, and the antiskid synchronizer 503 may include an engaging sleeve to adapt to the gear ring. With the engagement of the antiskid synchronizer 503, the second pair of wheels 77 may rotate together.

In some embodiments, as shown in FIG. 3, the antiskid synchronizer 503 may be disposed on the first output shaft 202 and configured to selectively engage with the fifth gear 405. In some embodiments, a gear ring may be provided on a side of the fifth gear 405 facing the antiskid synchronizer 503, and the antiskid synchronizer 503 may include an engaging sleeve to adapt to the gear ring. With the engagement of the antiskid synchronizer 503, the second pair of wheels 77 may rotate together.

In some embodiments, as shown in FIG. 4, the antiskid synchronizer 503 may be disposed on the first gear shaft 501 and configured to selectively engage with the seventh gear 407. In some embodiments, a gear ring may be provided on a side of the seventh gear 407 facing the antiskid synchronizer 503, and the antiskid synchronizer 503 may include an engaging sleeve to adapt to the gear ring. With the engagement of the antiskid synchronizer 503, the second pair of wheels 77 may rotate together.

In some embodiments, as shown in FIG. 5, the third motor generator 201 may be connected coaxially with a corresponding wheel, and the fourth motor generator 301 may be connected coaxially with a corresponding wheel. In some embodiments, both the third motor generator 201 and the fourth motor generator 301 may be wheel-side motors, thus shortening the transmission passage, reducing the power transmission loss and enhancing the transmission efficiency.

In some embodiments, as shown in FIGS. 5, the antiskid synchronizer 503 may be disposed on the first output shaft 202 corresponding to the third motor generator 201, and configured to selectively engage with the second output shaft 302 corresponding to the fourth motor generator 301. With the engagement of the antiskid synchronizer 503, the second pair of wheels 77 may rotate together.

The power transmission system 100 and the condition the power transmission system 100 may be used will be described below with reference to FIGS. 1-5.

Embodiment 1

As shown in FIG. 1, the engine 4 is connected with the input terminal 23d of the dual clutch 2d, the first output terminal 21d of the dual clutch 2d is connected with the first input shaft 11, and the second output terminal 22d of the dual clutch 2d is connected with the second input shaft 12. The input terminal 23d may be disengaged from both the first output terminal 21d and the second output terminal 22d, or the input terminal 23d may be engaged with one of the first output terminal 21d and the second output terminal 22d, or the input terminal 23d may be engaged with both the first output terminal 21d and the second output terminal 22d.

The second input shaft 12 may be a hollow shaft, and the first input shaft 11 may be a solid shaft. The second input shaft 12 is coaxially fitted over the first input shaft 11, and a part of the first input shaft 11 extends outside of the second input shaft 12 along an axial direction of the second input shaft 12.

The first-gear shift driving gear 1a, the third-gear shift driving gear 3a and the fifth-gear shift driving gear 5a are disposed on the first input shaft 11 and configured to rotate together with the first input shaft 11. The first-gear shift driving gear 1a is positioned in the right of the fifth-gear shift driving gear 5a, and the third-gear shift driving gear 3a is positioned in the left of the fifth-gear shift driving gear 5a.

The second-gear shift driving gear 2a and the fourth-sixth-gear shift driving gear 46a are disposed on the second input shaft 12 and configured to rotate together with the second input shaft 12.

The first output shaft 21 is arranged parallel to the two input shafts, i.e., the first and second input shafts 11, 12. The first-gear shift driven gear 1b, the second-gear shift driven gear 2b, the third-gear shift driven gear 3b and the fourth-gear shift driven gear 4b are fitted over the first output shaft 21. The first-gear shift driven gear 1b is configured to mesh directly with the first-gear shift driving gear 1a, the second-gear shift driving gear 2a is configured to mesh directly with the second-gear shift driven gear 2b, the third-gear shift driving gear 3a is configured to mesh directly with the third-gear shift driven gear 3b, and the fourth-sixth-gear shift driving gear 46a is configured to mesh directly with the fourth-gear shift driven gear 4b.

The first-third gear synchronizer 13c, the second-fourth gear synchronizer 24c are disposed on the first output shaft 21, and the first-third gear synchronizer 13c is positioned between the first-gear shift driven gear 1b and the third-gear shift driven gear 3b and configured to selectively synchronize the first output shaft 21 with the first-gear shift driven gear 1b or the third-gear shift driven gear 3b. The second-fourth gear synchronizer 24c is positioned between the second-gear shift driven gear 2b and the fourth-gear shift driven gear 4b and configured to selectively synchronize the first output shaft 21 with the second-gear shift driven gear 2b or the fourth-gear shift driven gear 4b.

The second output shaft 22 is arranged parallel to the two input shafts, i.e., the first and second input shafts 11, 12. The fifth-gear shift driven gear 5b and the sixth-gear 6b are fitted over the second output shaft 22. The fifth-gear shift driven gear 5b may mesh with the fifth-gear shift driving gear 5a directly. The sixth-gear shift driven gear 6b may mesh with the fourth-sixth-gear shift driving gear 46a directly. The fifth-sixth gear synchronizer 56c is disposed on the second output shaft 22 and is configured to synchronize the second output gear with the fifth-gear shift driven gear 5b or the sixth-gear shift driven gear 6b.

The fixed output gear 211 is fixed on the first output shaft 21 and configured to mesh with the shift driven gear 74. The output unit 221, i.e., output idler gear 221, is fixed on the second output shaft 22 and configured to mesh with the shift driven gear 74.

The output unit synchronizer 221c, i.e., the output idler gear synchronizer 221c, is positioned to the right of the output idler gear 221 and may engage with the output idler gear and with the second output shaft 22. The generator gear 73 is fixed on the second output shaft 22.

The first reverse idler gear 711 and the second reverse idler gear 712 are both fitted over the second output gear 22 to form a duplex gear. The first reverse idler gear 71 may mesh with the second-gear shift driving gear 2a.

The motor power shaft 3 is disposed coaxially with the two input shafts such as the first and second input shafts 11, 12 and the two output shafts such as the first and second output shafts 21, 22. The reverse output gear 72 and the third reverse idler gear 713 are fitted over the motor power shaft 3. The first motor gear 31 is fixed on the motor power shaft 3 and may mesh with the generator gear 73. The reverse synchronizer 72c is disposed on the reverse output gear 72 and may engage with the third reverse idler gear 713. The third idler gear 713 may mesh with the second reverse idler gear 712. The first motor generator 51 and the motor power shaft 3 are coaxially connected.

A condition in which the power transmission system 100 according to embodiments of the present disclosure may be used will be discussed below in detail with reference to FIG. 1.

Parking-Charging Condition

In the parking-charging condition, the engine 4 can drive the first motor generator 51 via two different transmission passages.

Transmission Passage 1

The fifth-sixth gear synchronizer 56c may engage with the fifth-gear shift driven gear 5b. Power generated by the engine 4 may transmit to the first motor generator 51 via the first input shaft 11, the fifth-gear gear pair, the second output shaft 22, the generator gear 73 and the motor power shaft gear 31, thus driving the first motor generator 51 to generate electric power.

Transmission Passage 2

The fifth-sixth gear synchronizer 56c may engage with the sixth-gear shift driven gear 6b. Power generated by the engine 4 may transmit to the first motor generator 51 via the second input shaft 12, the sixth-gear gear pair, the second output shaft 22, the generator gear 73 and the motor power shaft gear 31, thus driving the first motor generator 51 to generate electric power.

In the parking-charging condition, charging the vehicle with a fixed velocity ratio may be achieved, and the power transmission efficiency may be increased. Those with ordinary skill in the art will appreciate that the velocity ratio relates to parameters such as the rotating speed of the engine 4 in the parking state, the type of the first motor generator 51, and maximum rotating speed acceptable by the peripheral parts such as bearings, and so on. In the present disclosure, the velocity ratio may be designed according to the above parameters and the power transmission ratio may be flexibly designed, thus making maximum use of the power from the engine 4 and achieving the object of fast charging. In the parking-charging condition, power from the engine 4 may be transmitted via a transmission passage consisting of the first input shaft 11, the fifth-gear gear pair and the generator gear 73 or a transmission passage consisting of the second output shaft 22, the sixth-gear gear pair and the generator gear 73, and therefore the object of charging with an optimal fixed velocity ratio may be achieved, and both the charging efficiency and the fuel economy of the engine are improved.

Pure Electric Condition

First Electric Condition

The output unit synchronizer 221c engages the output unit 221, and power generated by the first motor generator 51 is transmitted to the output unit 221 via the motor power shaft gear 31 and the generator gear 73. This transmission passage has less transmission components and higher efficacy.

Second Electric Condition

Power generated by the first motor generator 51 is transmitted to the second-gear gear pair or the fourth-gear gear pair via the generator gear 73, the sixth-gear gear pair and the second input shaft 12.

Third Electric Condition

Power generated by the first motor generator 51 is transmitted to the first-gear gear pair or the third-gear gear pair via the generator gear 73, the fifth-gear gear pair and the first input shaft 11.

In the electric condition such as the first electric condition or the second electric condition, power from the first motor generator 51 may be transmitted to wheels of the vehicle via three power transmission passages having different velocity ratios, thus driving the vehicle to run. In cases when the first motor generator 51 is used to start, to accelerate, to climb or to run, different velocity ratios may be selected accordingly to ensure that the first motor generator 51 has the highest operation efficiency.

First First-Gear Hybrid Condition

The output unit synchronizer 221c engages the output unit 221, and power generated by the first motor generator 51 is transmitted to the output unit 221 via the motor power shaft gear 31 and the generator gear 73. This transmission passage has less transmission components and higher efficacy.

The first power generated by the engine 4 can be transmitted to any of the first-gear to fourth-gear gear pairs. The first power and second power are coupled at the driven gear 74, and then output together to the wheels of the vehicle.

The first power generated by the engine 4 can be transmitted to either the fifth-gear or the sixth-gear gear pair. The first power and the second power are coupled at the second output shaft 22 and then output together to the wheels of the vehicle.

In the hybrid reverse mode, the first motor generator 51 may adjust the speed, such that the shift driven gear 74 or the second output shaft 22 may synchronously receive the first power from the engine 4 and the second power from the first motor generator 51, to provide a smooth and harmonious power transmission.

First Second-Gear Hybrid Condition

In the first second-gear hybrid condition, the output unit synchronizer 221c is in a disengaged state. The power generated by the first motor generator 51 may transmit to the second input shaft 12 via the generator gear 73 and the sixth-gear gear pair. The power generated by the engine 4 may transmit to the second input shaft 12. The first power and the second power generated by the first motor generator 51 are coupled at the second input shaft 12, and then transmitted to either the second-gear gear pair or the fourth-gear gear pair, so as to be output. In some embodiments, the power generated by the engine 4 may transmit to either the first-gear gear pair or the third-gear gear pair via the first input shaft 11. Two powers are coupled at the first output shaft 21 and then output together.

In the hybrid reverse mode, the first motor generator 51 may adjust the speed, such that the second input shaft 12 or the first output shaft 21 may synchronously receive the first power from the engine 4 and the second power from the first motor generator 51, to provide a smooth and harmonious power transmission.

First Third-Gear Hybrid Condition

In the first third-gear hybrid condition, the output unit synchronizer 221c is in a disengaged state. The power generated by the first motor generator 51 may transmit to the first input shaft 11 via the generator gear 73 and the fifth-gear gear pair. The power generated by the engine 4 may transmit to the first input shaft 11. The first power and the second power generated by the first motor generator 51 are coupled at the first input shaft 11, and then transmitted to either the first-gear gear pair or the third-gear gear pair. In some embodiments, the power generated by the engine 4 may transmit to either the second-gear gear pair or the fourth-gear gear pair via the first output shaft 21. Two powers are coupled at the first output shaft 21 and then output together.

In the hybrid reverse mode, the first motor generator 51 may adjust the speed, such that the first input shaft 11 or the first output shaft 21 may synchronously receive the first power from the engine 4 and the second power from the first motor generator 51, to provide a smooth and harmonious power transmission.

In the present disclosure, a person skilled in the art may flexibly select any of the above hybrid conditions and power transmission passages thereof according to practical requirements. With these hybrid conditions, more driving fun may be provided to the users. In addition, the vehicle may be used in different road conditions, thus enhancing both the power and the fuel economy of the vehicle.

First First-Gear Driving-Charging Condition

In the first first-gear driving-charging condition, the power generated by the engine 4 can be transmitted to any of the first-gear to fourth-gear gear pairs. The output unit synchronizer 221c may engage with the output unit 221. Power generated by the corresponding wheel via the output unit 221 and the second output shat 22 may configure the generator gear 73 and the motor power shaft gear 31 rotate together with the motor power shaft 3. In some embodiments, the first motor generator 51 may drive to generate electric power by the power generated by corresponding wheel.

In some embodiments, the first power generated by the engine 4 can be transmitted to either the fifth-gear or the six-gear gear pair. At the same time, the output unit synchronizer 221c may engage with the output unit 221. The first power generated by the engine 4 may transmit to the second output shaft 22 via the fifth-gear gear pair or the sixth-gear gear pair. One part of the power may transmit to the output unit 221 to drive the wheels of the vehicle. The other part of the power may transmit to the first motor generator 51 via the generator gear 73, the motor power shaft gear 31 and the motor power shaft 3, thus driving the first motor generator 51 to generate electric power.

First Second-Gear Driving-Charging Condition

In the first-gear driving-charging condition, one of the two gear parts of the dual clutch 2d is engaged when performing power transmission, for example, the input terminal 23d is engaged with the first output terminal 21d or engaged with the second output terminal 22d. In the third first-gear driving-charging condition, the input terminal 23d is engaged with both the first output terminal 21d and the second output terminal 22d, thus achieving a new driving-charging condition.

Condition 1

In the first second-gear driving—charging condition, the fifth-sixth gear synchronizer 56c may engage with the fifth-gear shift driven gear 5b. The output unit synchronizer 221c is in a disengaged state. A part of the power generated by the engine 4 may transmit to the first motor generator 51 via the first input shaft 11, the fifth-gear gear pair, the second output shaft 22, the generator gear 73 and the motor power shaft gear 31, thus driving the first motor generator 51 to generate electric power. The other part of the power generated by the engine 4 may transmit to the first output shaft 21 to drive the wheels of the vehicle via the second input shaft 12, the second-gear gear pair or the fourth-gear gear pair.

Condition 2

In the first second-gear driving—charging condition, the fifth-sixth gear synchronizer 56c may engage with the sixth-gear shift driven gear 6b. The output unit synchronizer 221c is in a disengaged state. A part of the power generated by the engine 4 may transmit to the first motor generator 51 via the second input shaft 12, the sixth-gear gear pair, the second output shaft 22, the generator gear 73 and the motor power shaft gear 31, thus driving the first motor generator 51 to generate electric power. The other part of the power generated by the engine 4 may transmit to the first output shaft 21 to drive the wheels of the vehicle via the first input shaft 11, the second-gear gear pair or the fourth-gear gear pair.

In the present disclosure, a person skilled in the art may flexibly select any of the above hybrid conditions and power transmission passages thereof according to practical requirements. With these hybrid conditions, more driving fun may be provided to the users. In addition, the vehicle may be used in different road conditions, thus enhancing both the power and the fuel economy of the vehicle.

In the driving-charging conditions, a part of power from the engine 4 may be transmitted via a passage consisting of the first input shaft 11, the fifth-gear gear pair, and the generator gear 73, or a passage consisting of the second input shaft 12, the sixth-gear gear pair and the generator gear 73, and therefore the object of charging with an optimal fixed velocity ratio may be achieved, and both the charging efficiency and the fuel economy of the engine 4 are improved.

Mechanical Reverse Condition

In the mechanical reverse condition, the reverse synchronizer 72c may engage with the third reverse idler gear 713, such that the power generated by the engine 4 may transmit to the reverse output gear 72 via the second input shaft 12, the second-gear shift driving gear 2a, the first reverse idler gear 711, the second reverse idler gear 712 and the third reverse idler gear 713.

Electric Reverse Condition

In the electric reverse mode, the output unit synchronizer 221c may engage with the output unit 221, and the power generated by the first motor generator 51 may transmit to the output unit via the motor power shaft gear 31, the generator gear 73 and the second output shaft 22.

In the electric reverse mode, the output unit synchronizer 221c is in a disengaged state, and the fifth-sixth gear synchronizer 56c may engage with the sixth-gear shift driven gear 6b. At the same time, the reverse synchronizer 72c may engage with the third reverse idler gear 713, such that the power generated by the first motor generator 51 may transmit to the reverse output gear 72 via the generator gear 73, the sixth-gear gear pair, the second input shaft 12 and the reverse idler gear.

Hybrid (Electric-Mechanic) Reverse Condition

In the hybrid reverse mode, the reverse synchronizer 72c is in an engaged state and the fifth-sixth gear synchronizer 56c may engage with the sixth-gear shift driven gear 6b. The power generated by the engine 4 may transmit to the second input shaft 12, and the power generated by the first motor generator 51 may transmit to the second input shaft 12 via the generator gear 73 and the sixth-gear gear pair. The first power and the second power are coupled at the second input shaft 12, and then output together via the reverse idler gear. In the hybrid reverse mode, the first motor generator 51 may adjust the speed, such that the shift driven gear 74 may synchronously receive the first power from the engine 4 and the second power from the first motor generator 51, to provide a smooth and harmonious power transmission.

In the parking-charging condition and the running-charging condition, the power generated by the engine 4 may transmit to the first motor generator 51 via the generator gear 73 and the motor power shaft gear 31. The first motor generator 51 may always rotate along the original rotating direction (the predetermined rotating direction such as the clockwise direction). When the first generator is regarded as the power producer, such as the pure electric conditions and the hybrid conditions, the first motor generator 51 may always rotate along the original rotating direction (the predetermined rotating direction such as the clockwise direction). In the reverse conditions, when the power generated by the first motor generator 51 may output via a transmission passage consisting of the generator gear 73, the reverse idler gear and the reverse output gear 72, the first motor generator 51 may always rotate along the original rotating direction (the predetermined rotating direction such as the clockwise direction).

With the power transmission system 100 according to embodiments of the present disclosure, the first motor generator 51 may rotate along the predetermined rotating direction in all the above-mentioned conditions. In other words, the first motor generator 51 may always rotate along the predetermined rotating direction when functioning as a motor or as a generator. Even during the power transmission system 100 switching from one condition to the reverse condition, the rotating direction of the first motor generator 51 needs not to be changed. Therefore, the first motor generator 51 may always rotate along the predetermined rotating direction in all related conditions, such that problems of shock and interruption due to direction change of the motor may be avoided, and the life of the power transmission system 100 may be prolonged.

Embodiments 2-5

As shown in FIGS. 2-5, the power transmission system 100 in the present embodiment is substantially the same as that in Embodiment 1, with the following exceptions that a rear-wheel driving mechanism, a third motor generator 201, a fourth motor generator 301 and an antiskid synchronizer 503 are added respectively.

Embodiment 6

As shown in FIG. 6, the power transmission system 100 in the present embodiment is substantially the same as that in Embodiment 1, with the following exceptions that the engine 4, the dual clutch 2d, the first motor generator 51 and the differential may be avoided.

Embodiments of the present disclosure further provide a vehicle including the above-identified power transmission system 100. Other configuration such as the driving system, the turning system and the braking system may be well known to those skilled in the art, thus details thereof are omitted herein.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A power transmission system for a vehicle, comprising:
    an engine;
    a plurality of input shafts, wherein at least one of the input shafts is configured to engage with the engine; each of the input shafts being provided with a shift driving gear thereon;
    a plurality of output shafts, wherein each of the output shafts is provided with a shift driven gear configured to mesh with a corresponding shift driving gear;
    a motor power shaft, wherein the motor power shaft is configured to rotate together with one of the output shafts; and
    a first motor generator configured to operate together with the motor power shaft; wherein when the motor power shaft is rotated together with the one of the output shafts, the first motor generator is configured to generate electric power utilizing at least parts of power generated by the engine while a vehicle having the engine is in a running state or a parking state.

2. The power transmission system according to claim 1, further comprising an output unit configured to rotate with the one of the output shafts at a different speed or to engage with the one of the output shafts so as to rotate together with the one of the output shafts.

3. The power transmission system according to claim 2, further comprising an output unit synchronizer configured to synchronize the output unit with the one of the output shafts.

4. The power transmission system according to claim 3, wherein the output unit synchronizer is disposed on the one of the output shafts and configured to engage with the output unit.

5. The power transmission system according to claim 2, wherein the output unit comprises an output idler gear fitted over the one of the output shafts.

6. The power transmission system according to claim 3, wherein the motor power shaft is configured to rotate together with the one of the output shafts via a gear pair.

7. The power transmission system according to claim 6, further comprising a motor power shaft gear configured to fix on the motor power shaft and a generator gear fixed on the one of the output shafts and to mesh with the motor power shaft gear.

8. The power transmission system according to claim 7, further comprising:
- a reverse idler gear configured to rotate together with the shift driving gear; and
- a reverse output gear configured to selectively rotate together with the reverse idler gear.

9. The power transmission system according to claim 8, further comprising a reverse synchronizer configured to selectively synchronize the reverse output gear with the reverse idler gear.

10. The power transmission system according to claim 9, wherein the reverse synchronizer and the output unit synchronizer are configured to share a shift fork mechanism; wherein the output unit synchronizer is in a disengaged state when the output unit synchronizer synchronizes the reverse output gear with the reverse idler gear; wherein the reverse synchronizer is in a disengaged state when the output unit synchronizer synchronizes the output unit with the one of the output shafts.

11. The power transmission system according to claim 9, wherein the reverse idler gear comprises:
- a first reverse idler gear configured to mesh with the shift driving gear;
- a second reverse idler gear configured to rotate together with the first reverse idler gear;
- a third reverse idler gear configured to mesh with the second reverse idler gear; wherein the reverse synchronizer is configured to selectively synchronize the reverse output gear with the third reverse idler gear.

12. The power transmission system according to claim 11, wherein the reverse output gear is coaxially arranged with the third reverse idler gear; wherein the reverse synchronizer is disposed on one of the reverse output gear and the third reverse idler gear and to engage with the other.

13. The power transmission system according to claim 12, wherein the reverse output gear and the third reverse output gear are fitted over the motor power shaft; wherein the reverse synchronizer is disposed on the reverse output gear.

14. The power transmission system according to claim 11, wherein the first reverse idler gear and the second reverse idler gear are formed as an integrated joint gear structure.

15. The power transmission system according to claim 8, further comprising a fixed output gear; wherein the fixed output gear is fixed on other output shafts.

16. The power transmission system according to claim 15, wherein the output unit, the fixed output gear and the reverse output gear are configured to mesh with the shift driven gear of a main reducer of a vehicle.

17. The power transmission system according to claim 10, wherein the plurality of input shafts comprise a first input shaft and a second input shaft coaxially fitted over the first input shaft; wherein the plurality of the output shafts comprise a first output shaft and a second output shaft parallel to respectively the first and second input shafts; wherein the power transmission system further comprises a dual clutch comprising: an input terminal connected with the engine, a first output terminal coupled with the first input shaft, and a second output terminal coupled with the second input shaft.

18. The power transmission system according to claim 17, wherein the plurality of shift driving gears comprise: a first-gear driving gear disposed on the first input shaft, a second-gear driving gear disposed on the second input shaft, a third-gear driving gear disposed on the first input shaft, a fourth-gear driving gear disposed on the second input shaft, a fifth-gear driving gear disposed on the first input shaft, and a fourth-sixth-gear driving gear disposed on the second input shaft; wherein the plurality of shift driven gears comprise: first-gear to fourth-gear driven gears disposed on the first output shaft, a fifth-gear driven gear and a sixth-gear driven gear disposed on the second output shaft; wherein a first-third gear synchronizer disposed between the first-gear driven gear and the third-gear driven gear, a second-fourth gear synchronizer disposed between the second-gear driven gear and the fourth-gear driven gear, and a fifth-sixth gear synchronizer disposed between the fifth-gear shift driven gear and the sixth-gear shift driven gear.

19. The power transmission system according to claim 18, wherein the reverse idler gear is configured to mesh with the second-gear shift driving gear; wherein the generator gear is fixed on the second output shaft; wherein the output unit is fitted over the second output shaft.

20. The power transmission system according to claim 17, wherein the engine is configured to engage the input terminal of dual clutch with the first output terminal and the second output terminal of the dual clutch simultaneously to transmit a first part of power to one or more wheels via one of the output shafts, and to transmit a second part of power to the first motor generator via the generator gear to cause the first motor generator to generate electric power.

21. A vehicle comprising a power transmission system for a vehicle according to claim 1.

* * * * *